(12) United States Patent
Shetty et al.

(10) Patent No.: US 9,896,384 B2
(45) Date of Patent: Feb. 20, 2018

(54) METHODS OF SINTERING DENSE ZETA-PHASE TANTALUM CARBIDE

(71) Applicant: University of Utah Research Foundation, Salt Lake City, UT (US)

(72) Inventors: Dinesh K. Shetty, Salt Lake City, UT (US); Raymond A. Cutler, Salt Lake City, UT (US); Michael Sygnatowicz, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 48 days.

(21) Appl. No.: 14/742,616

(22) Filed: Jun. 17, 2015

(65) Prior Publication Data

US 2017/0113975 A1    Apr. 27, 2017

Related U.S. Application Data

(60) Provisional application No. 61/998,087, filed on Jun. 17, 2014, provisional application No. 62/107,125, filed on Jan. 23, 2015.

(51) Int. Cl.
*C04B 35/56* (2006.01)
*C04B 35/626* (2006.01)
*C04B 35/645* (2006.01)

(52) U.S. Cl.
CPC ...... *C04B 35/5607* (2013.01); *C04B 35/6261* (2013.01); *C04B 35/6268* (2013.01); *C04B 35/62675* (2013.01); *C04B 35/645* (2013.01); *C04B 35/6455* (2013.01); *C04B 2235/3251* (2013.01); *C04B 2235/404* (2013.01); *C04B 2235/44* (2013.01); *C04B 2235/5436* (2013.01); *C04B 2235/6562* (2013.01); *C04B 2235/6565* (2013.01); *C04B 2235/6567* (2013.01);
(Continued)

(58) Field of Classification Search
CPC ... C04B 35/56; C04B 35/5607; C04B 35/645; C04B 35/6455; C04B 35/65; C04B 35/74
See application file for complete search history.

(56) References Cited

U.S. PATENT DOCUMENTS 3,169,862 A   2/1965 Scheller
3,749,656 A   7/1973 Hara
(Continued)

FOREIGN PATENT DOCUMENTS

GB   694326   7/1953
GB   753659   7/1956

OTHER PUBLICATIONS

Kim et al.; In Situ Formation of Titanium Carbide in Titanium Powder Compacts by Gas-Solid Reaction; Composites: Park A 32, Sep. 20, 1999, 731-738; Elsevier.
(Continued)

*Primary Examiner* — Rebecca Lee
(74) *Attorney, Agent, or Firm* — Thorpe North & Western, LLP

(57) ABSTRACT

A method of forming a sintered ζ-phase tantalum carbide can include assembling a particulate mixture including a tantalum hydride powder and a carbon source powder. The particulate mixture can be sintered to form a tantalum carbide having at least 70 wt. % of a ζ-phase with at least about 90% densification. After sintering, the tantalum carbide can be cooled to substantially retain the ζ-phase.

20 Claims, 26 Drawing Sheets
(15 of 26 Drawing Sheet(s) Filed in Color)

(52) U.S. Cl.
CPC .. *C04B 2235/661* (2013.01); *C04B 2235/668* (2013.01); *C04B 2235/77* (2013.01); *C04B 2235/80* (2013.01)

(56) References Cited

U.S. PATENT DOCUMENTS

| | | | |
|---|---|---|---|
| 4,486,544 A | 12/1984 | De Pous | |
| 4,490,319 A | 12/1984 | Lee | |
| 4,515,746 A | 5/1985 | Brun | |
| 4,722,756 A | 2/1988 | Hard | |
| 5,082,491 A | 1/1992 | Rerat | |
| 5,221,647 A | 6/1993 | Hida | |
| 7,981,191 B2 | 7/2011 | Smokovich | |
| 8,685,874 B2 | 4/2014 | Shetty | |
| 2002/0051883 A1 | 5/2002 | Yadav | |
| 2004/0168548 A1 | 9/2004 | Wada | |
| 2006/0157603 A1 | 7/2006 | Dobbs | |
| 2011/0287923 A1* | 11/2011 | Shetty et al. | 501/87 |

OTHER PUBLICATIONS

Dipl et al., Tantalum- Processing, Properties and Applications, JOM vol. 41, Issue 10, Oct. 1989, 33-39.

Gusev et al., Atomic and Vacancy Ordering in Carbide ζ—Ta4C3-X($0.28 \leq x \leq 0.40$) and Phase Equilibria in the Ta-C System; Journal of Solid State Chemistry 180 (11), Nov. 2007, 3234-3246.

Hacket et al.; Phase Constitution and Mechanical Properties of Carbides in the Ta-C System; J. Am. Ceram. Soc., vol. 92, Issue 10, Jul. 16, 2009; 73 pages.

Zhang et al., Hot Pressing of Tantalum Carbide With and Without Sintering Additives, J. Am. Ceram. Soc., vol. 90, Issue 2, Jan. 26, 2007, 393-401.

Alexandre et al, Solid State Reaction Between Tantalum (Ta) and Tantalum Carbide (TaC) Powders During Hiping, Key Engineering Materials 132-136 (136), Jan. 1997, 868-871.

Liu et al., Microstructure and Mechanical Properties of Spark Plasma Sintered $TaC_{0.7}$ Ceramics, J. Am. Ceram. Soc., vol. 93, Issue 10, Jul. 2010, 2945-2947.

Liu et al., Microstructure and Mechanical Properties of Spark Plasma Sintered $Ta_2C$ Ceramics, Ceramics International, vol. 38, Issue 6, Aug. 2012, 4707-4713; Elsevier.

Barsoum et al., Thermal Properties of $Ti_3SiC_2$, Journal of Physics and Chemistry of Solids, vol. 60, Issue 4, Apr. 1999, 429-439; Elsevier.

Tzenov et al., Synthesis and Characterization of $Ti_3AlC_2$, J. Am. Ceram. Soc., vol. 83, Issue 4, Apr. 2000, 825-835.

Small et al., Hydriding Reactions in Ball-Milled Titanium, Journal of Alloy and Compounds vol. 284, Issue 1-2, Mar. 4, 1999, 312-315; Elsevier.

Bobet et al., On the Production of Ultra-Fine Titanium Hydride Powder at Room Temperature, Journal of Alloys and Compounds, vol. 348, Issues 1-2, Jan. 13, 2003, 247-251; Elsevier.

* cited by examiner

METHODS OF SINTERING DENSE ZETA-PHASE TANTALUM CARBIDE

RELATED APPLICATION(S)

This application is related to U.S. Provisional Application No. 61/998,087, filed Jun. 17, 2014, and U.S. Provisional Application No. 62/107,125, filed Jan. 23, 2015, which are incorporated herein by reference.

FIELD OF THE INVENTION

The present invention relates to ceramic carbide materials, in particular tantalum carbide. The invention also relates to sintering methods including pressureless sintering.

BACKGROUND

Tantalum carbide (TaC) is utilized in high temperature applications, such as booster rocket motor nozzle liners. While TaC is chemically compatible with the aluminum propellant and has a high melting point, other properties, such as strength, thermal shock-resistance, and ultimately durability in applications wherein components are stressed under rapid temperature changes leave much to be desired. However, few materials meet the initial temperature resistance requirements, and as such, TaC continues to be used. Ceramic materials including ζ-phase tantalum carbide have recently been developed to have increased toughness. These ζ-phase tantalum carbide materials have been produced by high temperature and high pressure sintering methods, such as the methods disclosed in U.S. Pat. No. 8,685,874 B2. Despite such technologies, continued improvements in processing are sought with the goal of achieving near-net-shape at lower cost.

SUMMARY

The present technology provides methods for pressureless sintering shaped green compacts to produce dense ζ-phase tantalum carbide. In one example, a method of forming a sintered ζ-phase tantalum carbide can include assembling a particulate mixture including a tantalum hydride powder and a carbon source powder. The particulate mixture can be sintered to form a tantalum carbide having at least 70 wt. % of a ζ-phase with at least about 90% densification. After sintering, the tantalum carbide can be cooled to substantially retain the ζ-phase.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
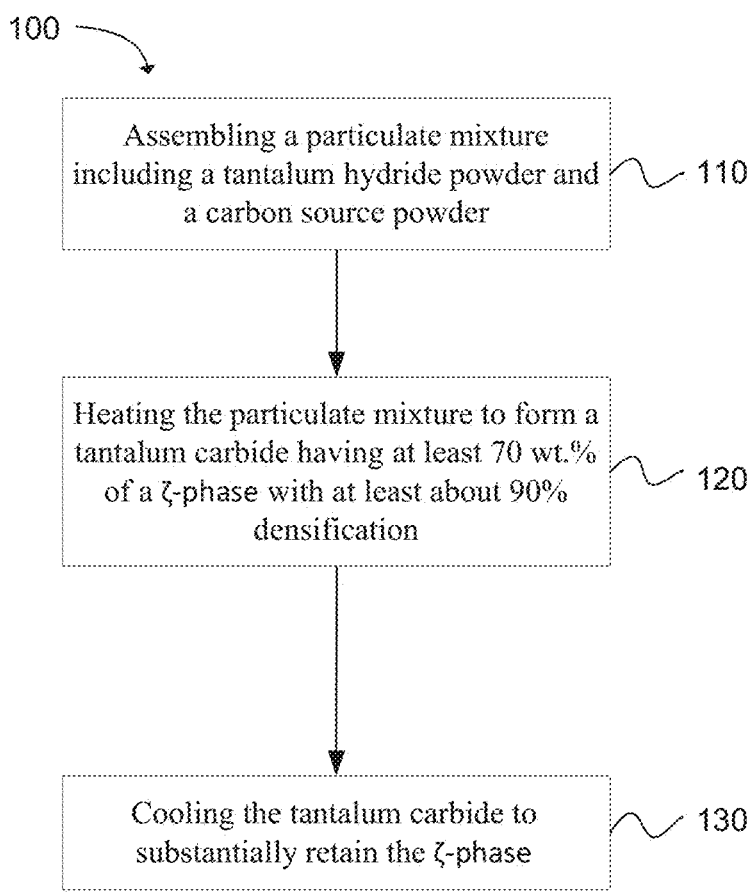
FIG. 1 is a flowchart illustrating a method of forming a sintered ζ-phase tantalum carbide in accordance with an embodiment of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

It is noted that, as used in this specification and in the appended claims, the singular forms "a," "an," and "the" include plural referents unless the context clearly dictates otherwise. Thus, for example, reference to "a layer" includes one or more of such features, reference to "a particle" includes reference to one or more of such elements, and reference to "heating" includes reference to one or more of such steps.

As used herein, "pressureless sintering" refers to sintering at much lower pressures than those used in hot pressing, hot isostatic pressing, and similar high-pressure sintering methods. Such high-pressure sintering methods often use pressures of thousands of atmospheres. In some cases, pressureless sintering can be performed at or around atmospheric pressure, although pressures above and below atmospheric pressure can also be used. For example, in some cases pressureless sintering can be performed at pressures from about 0.01 atm to about 3 atm, and most often about 0.9 atm to 1.5 atm.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. The use of "substantially" is equally applicable when used in a negative connotation to refer to the complete or near complete lack of an action, characteristic, property, state, structure, item, or result.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Methods of Forming a Sintered ζ-Phase Tantalum Carbide

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the figures should not be considered limiting.

The present invention provides methods of forming a sintered ζ-phase tantalum carbide. FIG. 1 is a flowchart of a method 100 including assembling a particulate mixture including a tantalum hydride powder and a carbon source powder 110. Although not required, the tantalum hydride powder can typically be obtained by hydrogenation of a tantalum metal powder (i.e. substantially pure Ta). The method can further include heating the particulate mixture to form a tantalum carbide having at least 70 wt. % of a ζ-phase with at least about 90% densification 120. The method can also include cooling the tantalum carbide to substantially retain the ζ-phase 130.

Figure 2:
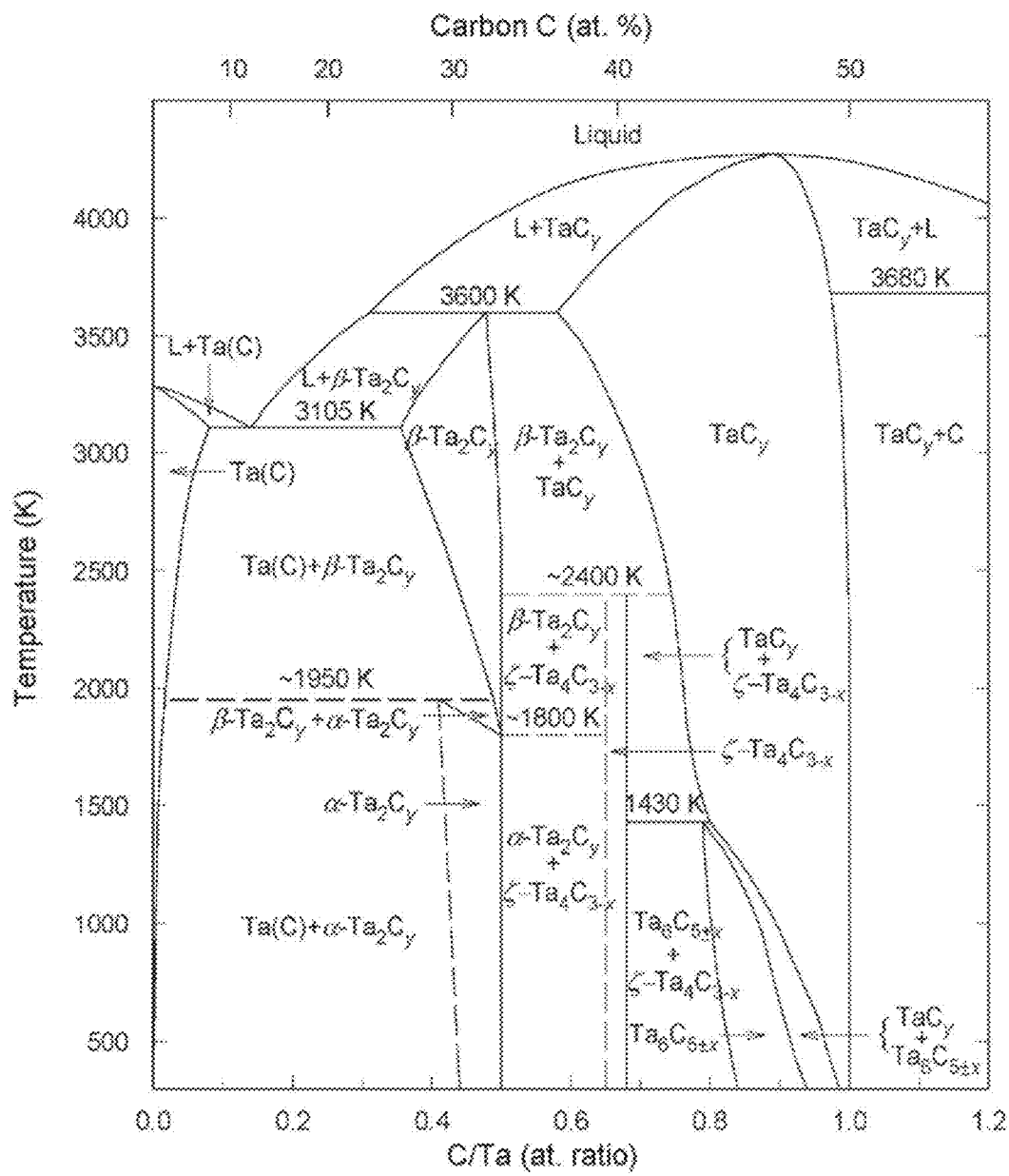
FIG. 2 is a phase diagram of the Ta—C system.

The Ta—C binary system includes several carbides, such as γ-TaC$_y$ (fcc), α- or β-Ta$_2$C$_{y'}$ (hcp), and the rhombohedral (trigonal) ζ-Ta$_4$C$_{3-x}$. FIG. 2 shows a Ta-ζ phase diagram. As seen in the phase diagram, these carbides exhibit wide ranges of nonstoichiometries relative to their nominal structural chemical formulae. These three carbides also offer some unique properties. The γ-TaC$_y$ phase has an extremely high melting point (T$_m$≈4000° C. for TaC$_{0.9}$), second only to HfC. The α/β-Ta$_2$C$_{y'}$ phase exhibits high oxidation resistance and ablation resistance, and substantial plasticity at elevated temperatures. It has been shown recently that tantalum carbides containing high weight fractions of the ζ-Ta$_4$C$_{3-x}$ phase exhibit high fracture toughness (K$_c$≈12.7 MPa√m for 83 wt. % ζ-Ta$_4$C$_{3-x}$).

Due to their high melting temperatures, Ta and Ta carbides can be difficult to sinter. These materials are often consolidated by hot-pressing, canned hot-isostatic pressing (HIP), or spark plasma sintering (SPS). In another example, mixtures of γ-TaC and Ta with C/Ta atomic ratios of 1.0, 0.9, 0.8, 0.7 and 0.6 can be hot-pressed at 1800° C. for 120 minutes without the use of sintering aids to obtain densities exceeding 96% of theoretical with relative amounts of phases at the different C/Ta ratios consistent with the phase diagram of FIG. 2. The composition corresponding to C/Ta=0.6 produces a two-phase mixture of 83 wt. % of ζ-Ta$_4$C$_{3-x}$ and 17 wt. % of α-Ta$_2$C and exhibits a high fracture toughness of 12.7 MPa√m in single-edge-pre-cracked-beam (SEPB) tests.

The ζ-Ta$_4$C$_{3-x}$ phase has a nano-lamellar microstructure with easy-cleaving basal planes. Without being bound to a specific mechanism, it is believed that the ζ-Ta$_4$C$_{3-x}$ phase nucleates on the close packed planes in both α-Ta$_2$C$_{y'}$ and γ-TaC$_y$ grains. When the ζ-Ta$_4$C$_{3-x}$ phase nucleates within the γ-TaC$_y$ grains, the ζ-Ta$_4$C$_{3-x}$ phase acquires a complex crisscrossing platelet morphology as a result of the multiple close-packed {111} planes in the fcc structure. Conversely, when the ζ-Ta$_4$C$_{3-x}$ phase nucleates within α-Ta$_2$C$_{y'}$ grains, the ζ-Ta$_4$C$_{3-x}$ phase acquires a uniform parallel lamellar morphology, due to the single family of {0001} close-packed planes available in the hcp structure. The ζ-Ta$_4$C$_{3-x}$ phase is stable at low temperatures, even after annealing, and/or pulverization.

The present technology provides pressureless sintering of Ta-based materials to fabricate near-net-shape components of high density, controlled phase content and microstructure. Particle sizes of the starting materials, for example, Ta metal and/or γ-TaC, can affect the kinetics of formation and densification of the desired phase. Fine grained Ta metal powder is difficult to produce by conventional milling due to its ductility. Embrittlement of metals by hydrogenation has been successfully employed in the production of fine titanium, zirconium, and magnesium powders, and has been a processing step in the capacitor industry to make Ta powder. Hydrogenating Ta powder, keeping the Ta powder hydrogenated until alloying or secondary milling with powders such as γ-TaC, and then dehydrogenating the powder as part of the densification process can greatly improve sinterability by limiting the formation of agglomerates and removing surface oxides from Ta and γ-TaC powders.

The present technology allows for processing of a tantalum carbide, ζ-Ta$_4$C$_{3-x}$, to high density (>94% of theoretical) by pressureless sintering. Interest in ζ-Ta$_4$C$_{3-x}$ arises from its nano-lamellar substructure due to easy-cleaving basal planes and its role in the high fracture toughness of this carbide. Both densification and formation of the ζ-Ta$_4$C$_{3-x}$ phase can be promoted by the hydrogenation of the Ta metal powder to produce β-TaH$_x$ prior to milling with γ-TaC powder. Commercially-available Ta metal powders are typically coarse and highly agglomerated. Milling of this powder can lead to deformation and formation of large, flake-like agglomerates. These agglomerates do not pack well with the much finer, equiaxed γ-TaC particles. The low packing density and associated large pores and long diffusion distance in the Ta agglomerates can suppress both densification and formation of the α-Ta$_2$C$_{y'}$ phase, the precursor to the ζ-Ta$_4$C$_{3-x}$ phase. The β-TaH$_x$ phase formed on hydrogenation of the Ta metal powders/agglomerates is significantly harder and more brittle than the Ta metal. Milling of the hydrogenated powder can lead to more efficient comminution by breaking down the Ta agglomerates without significant deformation. This leads to smaller and more equiaxed Ta metal particles and more efficient packing with the γ-TaC powder. This enhances both densification and phase conversion to α-Ta$_2$C$_{y'}$.

In some examples of the present technology, starting materials for a process of forming sintered ζ-phase tantalum carbide can include a tantalum hydride powder and a carbon source powder. Tantalum hydride can exist in multiple phases. For example, the tantalum hydride powder can include α-, β-, γ-, δ-, ε-, or ζ-phase tantalum hydride. In some cases, the tantalum hydride powder used in the present technology can include β-phase TaH$_x$. In some cases, the tantalum hydride powder can be prepared by hydrogenation of a tantalum metal powder. This can be performed as a step in the method of forming sintered ζ-phase tantalum carbide. Alternatively, a commercially available tantalum hydride powder can be obtained and used in the process.

Tantalum hydride can be milled to a small particle size more easily than tantalum metal powder. In some examples of the present technology, the tantalum hydride powder can have an average particle size of 2-20 µm. In certain cases, the tantalum hydride powder can have an average particle size of 5-10 µm. The tantalum hydride powder can also have a bimodal size distribution, with small single particles and larger agglomerations of tantalum hydride particles. For example, tantalum hydride powder can have a primary distribution of single particles with an average particle size of 2-5 µm and a secondary distribution of agglomerates with an average agglomerate size of 5-20 µm. Smaller and more uniform particle sizes can be useful for obtaining both high green density and high sintered density.

The tantalum hydride powder particles can have a low aspect ratio. In one example, the tantalum hydride particles can have an average particle aspect ratio from about 1 to about 1.3. Equiaxed particles (i.e., having an aspect ratio close to 1) can be useful for achieving high packing density and high sintered density. Equiaxed particles can be more easily formed from tantalum hydride compared to tantalum metal, which can often form larger elongated plate-shaped particles during milling.

The carbon source powder can include graphite powder, amorphous carbon powder, tantalum carbide powder, or combinations thereof. In one example, γ-phase tantalum carbide can be used as the carbon source powder. In further examples, any tantalum carbide powder with the formula $TaC_y$ can be used where y is greater than about 0.68. Use of γ-TaC powder as the carbon source instead of carbon powder can provide better control of chemistry by limiting carbon volatilization during pressureless sintering. Optionally, carbon powder can be used as a carbon source although controlling the C/Ta ratio can be challenging. Additionally, tracking of carbon weight fraction during heating and sintering can be less accurate with carbon powder due to its low atomic weight and weight percent relative to γ-TaC.

The γ-TaC powder can have an average particle size from about 0.5 µm to about 20 µm. In some examples, the γ-TaC powder can have an average particle size that is roughly the same as the tantalum hydride powder. In other examples, the γ-TaC powder can have an average particle size that is less than the tantalum hydride powder. In one example, the γ-TaC powder can have an average particle size of less than about 2 µm and often less than about 1 µm. Typically, the powder can also be equiaxed particles. For example, the γ-TaC powder can also have an aspect ratio from about 1 to about 1.3 in some examples.

The tantalum hydride powder and the carbon source powder can be mixed prior to dehydrogenation and sintering. In some cases, the powders can be mixed by milling. Exemplary methods of milling the powders include ball milling, planetary ball milling, and paint-shaker milling. In one example, the tantalum hydride powder and the carbon source powder can be milled together in a planetary ball mill. In another example, the tantalum hydride powder can be formed by hydrogenating a tantalum metal powder and reducing the size of the hydrogenated powder by milling. Then, the tantalum hydride powder can be milled together with the carbon source powder to mix the powders. In some cases, milling the hydrogenated tantalum powder with a planetary ball mill can result in higher density in the sintered material than milling the powder with a ball mill or other type of mill.

The tantalum hydride powder and carbon source powder can be mixed in amounts that produce a C/Ta mole ratio in the range that will allow for ζ-phase tantalum carbide to form. In some cases, the powder mixture can have a C/Ta ratio of from about 0.64 to about 0.68. In one example, the powder mixture can have a C/Ta ratio of about 0.66. The C/Ta ratio of the powder mixture can be adjusted to obtain desired amounts of ζ-phase, γ-phase, and α-phase tantalum carbide in the final sintered material. In some examples, the C/Ta ratio can be below 0.64 to obtain a mixture of ζ-phase and ζ-phase tantalum carbide. In other examples, the C/Ta ratio can be above 0.68 to obtain a mixture of ζ-phase and γ-phase tantalum carbide. Even in the range of 0.64-0.68, a mixture of ζ-phase with one or more of γ-phase and α-phase can often be obtained. In some examples, the sintered material can contain at least 70 wt. % of the ζ-phase. In further examples, the sintered material can contain at least 80 wt. % or at least 85 wt. % of the ζ-phase. In still further examples, the sintered material can contain less than 10 wt. % of the α-$Ta_2C$ phase. In other examples, the sintered material can contain less than 20 wt. % of the γ-$TaC_y$ phase, and in some cases less than 15 wt. %. The weight percents of the residual γ-$TaC_y$ or α-$Ta_2C$ phase in the sintered material can depend on both the C/Ta ratio of the starting powder mix and the method of sintering. For example, for a starting powder C/Ta ratio of 0.66, the weight percent of the residual γ-$TaC_y$ phase can be about 13.3 wt. % for pressureless sintered compacts. The residual γ-$TaC_y$ phase can drop to about 4.6 wt. % for hot-pressed compacts. In many cases, 100 wt. % of the ζ-phase can be desirable in pressureless sintered compacts. In one example, this target can be approached by starting with a powder mix of C/Ta=0.64 and using hydrogenated Ta powder and planetary milling to prepare the powder. α-$Ta_2C$ phase can be retained in powder mixes with C/Ta<0.64. For example, a powder mix of C/Ta=0.625 can lead to about 15 wt. % of α-$Ta_2C$ and about 85 wt. % of the ζ-phase in a hot-pressed compact.

After mixing the tantalum hydride powder and carbon source powder, the powder mixture can be formed into a compact and then sintered. This process can be performed at low pressure. Specifically, the sintering can be performed at a pressure of from about 0.01 atm to about 2 atm. In a further example, the sintering can be performed at a pressure of from about 0.01 atm to about 1.5 atm, such as about 1 atm. The compact can be heated to a sintering temperature for a sufficient hold time to reach a desired densification. In some cases, the sintering temperature can be from about 1700° C. to about 1900° C. As the compact is heated up to the sintering temperature, the material undergoes the following stages: (a) decomposition of tantalum hydride above 300-350° C. to form Ta metal; (b) the conversion of the Ta metal to α-$Ta_2C_{y'}$ and a concurrent depletion of C in γ-$TaC_y$ at temperatures ranging from 900° C. to 1200° C.; (c) equilibration of α-$Ta_2C$ and γ-$TaC_{0.78}$ phases at temperatures between 1200° C. and 1500° C.; and (d) the conversion of the α-$Ta_2C$ and the γ-$TaC_{0.78}$ phases to ζ-$Ta_4C_{3-x}$ at temperatures above 1500° C. Analyses of the kinetics reveal a low activation energy for the formation of the α-$Ta_2C_{y'}$ phase in the second stage, while a high activation energy characterizes the formation of the ζ-$Ta_4C_{3-x}$ phase. The kinetics of formation of the ζ-$Ta_4C_{3-x}$ phase can be enhanced by hydrogenation and milling of the Ta powder which can increase the sinterability of the Ta powder by reducing particle size.

The sintering can be performed for a hold time from 600 s to 60,000 s. In a particular example, the sintering can be performed for a hold time from 600 s to 6,000 s. In another particular example, the sintering can be performed for a hold time sufficient to reach a densification of at least 90% and in some cases at least 94%. The compact can often be pressureless sintered to greater than 94% of theoretical density. In a further example, the compact can be pressureless sintered to greater than 97% of theoretical density. The final sintered material can include a majority of ζ-Ta$_4$C$_{3-x}$ with smaller amounts of γ-TaC$_y$ and trace amounts of Ta oxides. If high pressure sintering methods are used, the compact can optionally be sintered to even higher densities, such as greater than 99% of the theoretical density. High pressure sintering methods can also in some cases result in a higher ζ-Ta$_4$C$_{3-x}$ content. However, pressureless sintering can be used to obtain sintered materials with more than 80 wt. %, more than 85 wt. %, or more than 86 wt. % of the ζ-Ta$_4$C$_{3-x}$ phase.

Example 1: Preparation of Powder Mixture

A Ta metal powder (Grade 73MR-0001, Inframat Advanced Materials LLC, Manchester, Conn.) and a γ-TaC powder (Grade 100, Global Tungsten & Powders Corp, Towanda, Pa.) were used as the starting powders to react and produce ζ-Ta$_4$C$_{3-x}$. The Ta powder was reported to be 99.95% pure with oxygen (500-1800 ppm) and niobium (<50 ppm) as the major impurities. The mean particle size was in the range of 5-10 μm. The γ-TaC powder was reported as containing major impurities of tungsten (300 ppm), niobium (340 ppm) and oxygen (970 ppm). The mean particle size was 0.9 μm. As seen in FIG. 2, ζ-Ta$_4$C$_{3-x}$ exists as a stable single phase in a range of C/Ta atom ratio from 0.65 to 0.68. A C/Ta atom ratio of 0.66 was selected to obtain single-phase ζ-Ta$_4$C$_{3-x}$.

The Ta powder was hydrogenated and embrittled prior to comminution. Ta powder with 0.03 wt. % PdCl$_2$ catalyst (Cat. No.: AC19520-0250, Fisher Scientific, Pittsburgh, Pa.) or 0.04 wt. % Pd(NO$_3$)$_2$ catalyst (Product No.: 11035, Alfa Aesar, Ward Hill, Mass.) were mixed by shaking in a polyethylene (PE) bottle with acetone as the medium. Hydrogenation of the dried Ta powder was carried out in a stainless steel chamber. The chamber was heated to and held at 300-350° C. for 4 to 8 hours in flowing ultra-high purity (99.99%) hydrogen gas. The sample was cooled to room temperature in flowing hydrogen. The powder was then poured into an acetone bath to avoid spontaneous reaction with air. The powder-acetone mixture was left to dry in air.

For a comparative example, as-received Ta powder (unhydrogenated) and γ-TaC powder were milled by rolling in hexane in a 500 ml high-density poly(ethylene) (HDPE) jar and WC-Co media at 110 rpm for 8 hours. The powder to media weight ratio was 1:10. After milling, the mixture was air dried and designated TaC0.66$^a$.

A second batch of powder of the TaC0.66 composition was prepared by milling a mixture of H$_2$-treated Ta powder and γ-TaC powder. The H$_2$-treated Ta powder was separately ball-milled in hexane for 60 minutes using a paint shaker (Model 1410, Red Devil Equipment Co., Plymouth, Minn.) in a 500 ml HDPE jar in hexane with powder to WC-Co media weight ratio of 1:10. After the addition of γ-TaC powder the mixture was ball-milled for an additional 60 minutes using the paint shaker under the same conditions. After milling, the mixture was air dried. This powder batch was designated TaC0.66$^b$.

Example 2: Sintering

The milled powders of Example 1 were uniaxially pressed into approximately 5 g pellets of 14.27 mm diameter at 280 MPa. The TaC0.66$^a$ pellets were sintered in Ar in a graphite furnace while resting on Mo sheets using a heating rate of 40° C./min and held isothermally at 1700° C. and 1800° C. for times of 10, 100 and 1000 min. The pellets were cooled in Ar to room temperature. Separately, 200 g of the TaC0.66$^a$ powder was hot pressed into a billet (45 mm×45 mm×5 mm) in an argon atmosphere using a heating rate of 25° C./min from room temperature to 1500° C. and then heated to 1800° C. at 7° C./min and held isothermally for 120 minutes at a pressure of 24 MPa. The pressure was maintained while cooling to 800° C. and further cooled to room temperature without the pressure. The billet was then hot-isostatically pressed (HIPed) (American Isostatic Presses, Inc., Columbus Ohio) using a heating/cooling rate of 10° C./min from room temperature to 1800° C. and held isothermally for 120 minutes at a pressure of 207 MPa. Pressure was held during heating and cooling at 207 MPa.

Example 3: Phase Analysis

To investigate and monitor the formation of transient phases by reaction of Ta and γ-TaC prior to forming the equilibrium ζ-Ta$_4$C$_{3-x}$ phase, the TaC0.66$^b$ pellets were annealed in Ar in a molybdenum (Mo) furnace using a heating rate of 40° C./min and held isothermally from 900° C. to 1300° C. for 100 minutes. From 1600° C. to 1900° C. pellets were sintered for 100 minutes in a graphite furnace as described before. A second set of pellets was annealed at 900° C., 1000° C., 1100° C. and 1200° C. for times ranging between 0 and 1000 minutes to investigate the kinetics of the formation of the transient α-Ta$_2$C$_{y'}$ phase. A final set of pellets was sintered at 1600° C., 1700° C., 1800° C. for times ranging between 0 and 1000 min to investigate the kinetics of formation of the equilibrium ζ-Ta$_4$C$_{3-x}$ phase. All the pellets were cooled to room temperature in Ar atmosphere.

Following milling, the powder particle morphology was studied using a scanning electron microscope (SEM, Model S-3000N, Hitachi High Technologies America, Inc., Dallas, Tex.). Specific surface areas of the powder samples were measured by the gas-adsorption technique (Model Gemini V, Micromeritics Instrument Corp., Norcross, Ga.) and particle-size distribution was measured using a laser-diffraction particle-size analyzer (Model LS 230, Beckman Coulter, Inc., Miami, Fla.) in the Mie mode using suspensions of powders in a 50/50 wt. % water/glycerol solution. Phase contents of all materials were assessed using an X-ray diffractometer (XRD, Model Philips X'Pert-MPD, PANalytical Inc., Westborough, Mass.). Prior to analysis, pellets annealed from 900° C. to 1300° C. were pulverized using an alumina mortar and pestle. Pellets sintered above 1500° C. had approximately 0.5 mm of top surface ground away and were polished to a 600 grit finish prior to XRD analysis. Crystalline phases present in the powder, pellet, and billet samples were identified using XRD software (X'Pert High Score Plus, Version 2.2d, PANalytical, Almelo, The Netherlands). Crystallographic structural data (space group and atomic positions) for Ta, β-TaH$_x$, α-Ta$_2$C, and γ-TaC were obtained from powder diffraction files (powder diffraction file, ICDD, USA). Crystallographic structural data for ζ-Ta$_4$C$_{3-x}$ were constructed by referencing Gusev et al., "Atomic and Vacancy Ordering in Carbide ζ-Ta$_4$C$_{3-x}$ (0.28<x<0.40) and Phase Equilibria in the Ta—C system," *J. Solid State Chem.*, 180 3234-46 (2007). Phase contents and lattice parameters of the phases were calculated by the Rietveld refinement method. The kinetics of phase formation was analyzed using commercial software (OriginPro 9.0.0, OriginLab Corporation, Northampton, Mass.). Data were analyzed using a non-linear curve fitting option of the software. Select samples were polished to a 0.1 μm finish and etched using a mixture of 20 mL H$_2$O, 5 mL HNO$_3$, 3 mL HCl, and 12 mL HF for approximately 60 to 90 seconds.

Etched surfaces were examined by optical microscope. Grain size measurements and wt. % phase content were also studied using electron backscatter diffraction (EBSD) using a field emission gun scanning electron microscope (Phillips XL/30 FEGSEM, Eindhoven, Netherlands) equipped with a sensitive CCD camera and EBSD software (OIM Analysis and Data Collection, Version 7, EDAX).

Figure 3:
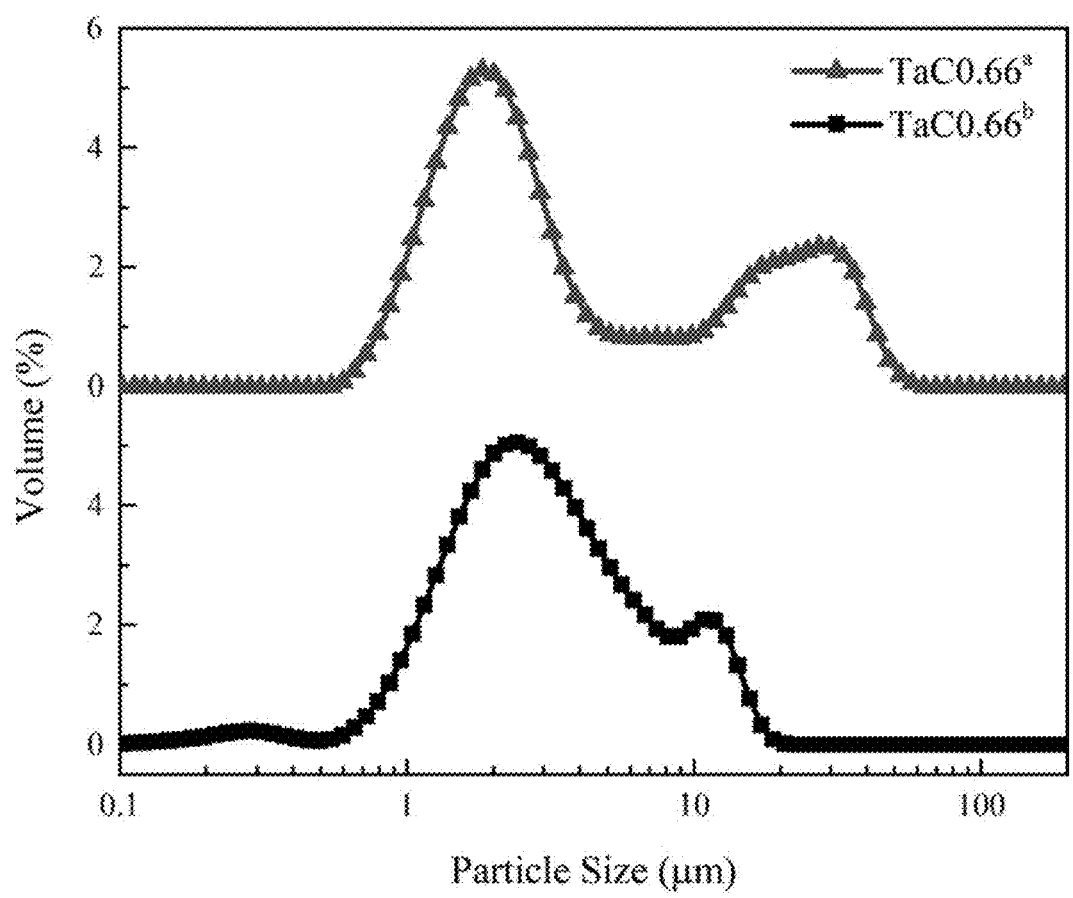
FIG. 3 is a graph of particle size distributions of milled TaC0.66$^a$ and TaC0.66$^b$ powders.
Figure 4A:
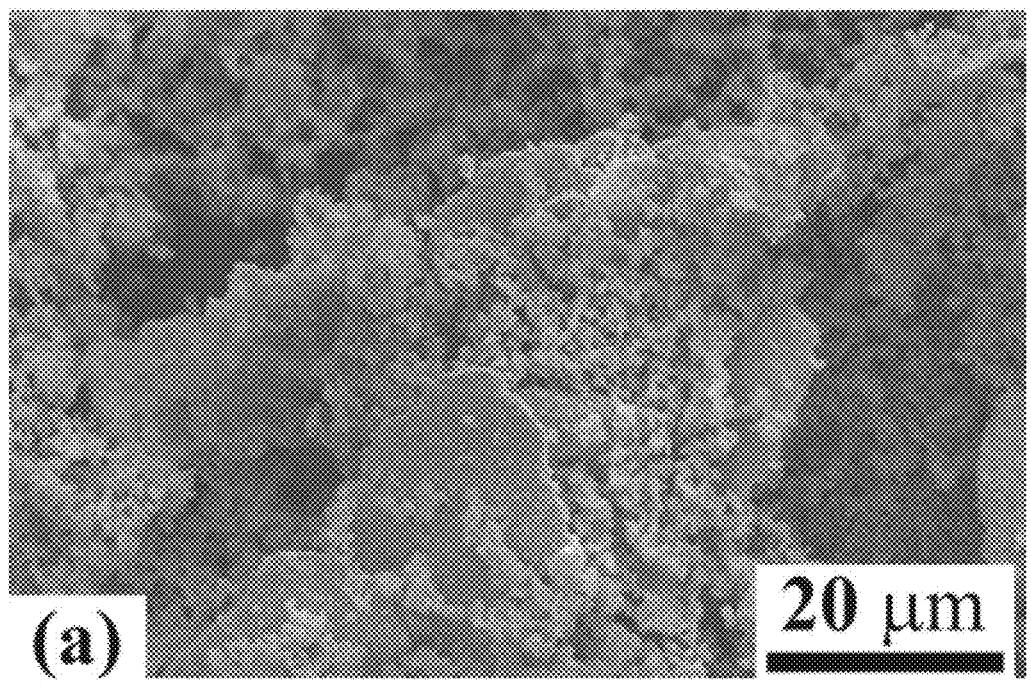
FIG. 4(a) shows an SEM image of milled TaC0.66$^a$ powders.
Figure 4B:
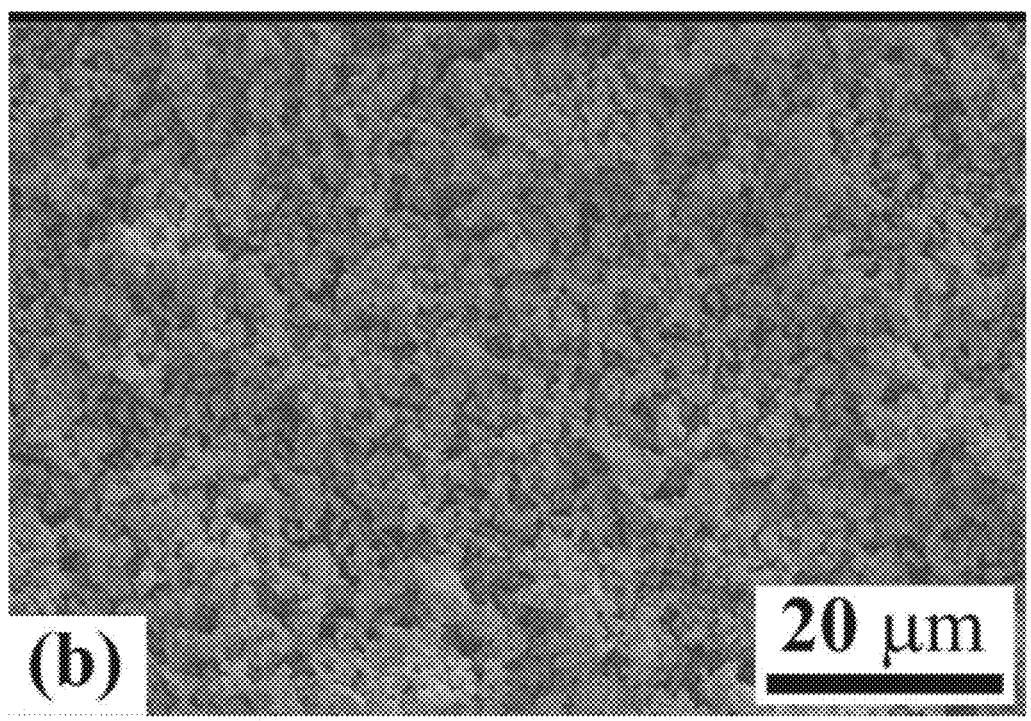
FIG. 4(b) shows an SEM image of milled TaC0.66$^b$ powders.

The specific surface areas of the as-received Ta and γ-TaC powders were 0.14 $m^2/g$ and 0.93 $m^2/g$, respectively. The specific surface areas of the milled TaC0.66$^a$ and TaC0.66$^b$ powder samples were 0.85 $m^2/g$ and 0.89 $m^2/g$, respectively. The particle-size distributions of the two powders are shown in FIG. 3. The TaC0.66$^a$ powder showed a bimodal distribution with modes at 1.8 μm and 27 μm. The primary distribution with the 1.8 μm mode is likely that of γ-TaC which is the smaller and the harder phase. The secondary distribution with the 27 μm mode is broad with particle sizes ranging from 10 to 60 μm, likely a result of the deformation, flattening and agglomeration of the Ta particles. The TaC0.66$^b$ powder showed one major distribution with a mode of 2.4 μm and a minor distribution with a mode of 11 μm. The primary distribution was broad and likely consisted of γ-TaC and smaller $H_2$-treated Ta particles. The secondary distribution likely contained larger $H_2$-treated Ta agglomerates between 5 μm and 20 μm in size. SEM images of the milled powders are shown in FIGS. 4(a) and 4(b). The TaC0.66$^a$ powder (FIG. 4(a)) showed particles with two distinct morphologies. Smaller particles under 5 μm in size were distributed among flat, highly deformed plate-like agglomerated particles ranging in size upwards of 100 μm. FIG. 4(b) shows the SEM image of the milled TaC0.66$^b$ powder. The powder contained equiaxed particles with a significant number under 1 μm and few particles larger than 5 μm. The particles did not appear deformed or plate-like.

Figure 5:
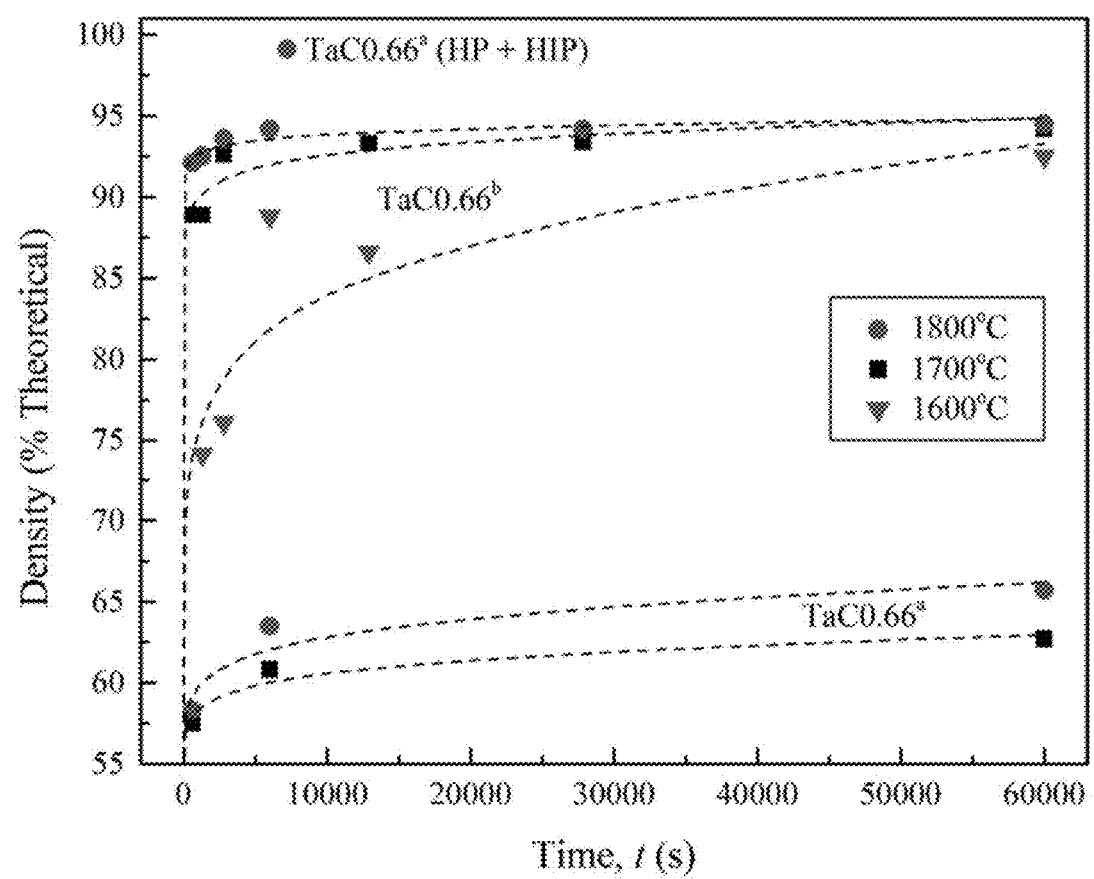
FIG. 5 is a graph showing increase in densities of Ta0.66$^a$ and Ta0.66$^b$ pellets as functions of time during sintering at different temperatures.

FIG. 5 shows plots of densities, expressed as percent of theoretical densities, measured on the TaC0.66$^a$ and TaC0.66$^b$ pellets as functions of time during sintering at different temperatures. The theoretical densities used to normalize the measured densities were based on the phase contents as measured by the Rietveld refinement technique and the theoretical densities of the various phases present in the sintered pellets. The pellets of the TaC0.66$^a$ powder reached a maximum density of 66% of theoretical after sintering at 1800° C. for 60,000 s. However, the same powder can be hot-pressed and HIPed to a density of 99.1% of theoretical at 1800° C. and 7200 s. The pellets of the $H_2$-treated and milled powder, TaC0.66$^b$, reached a density of 94.8% theoretical, when sintered at 1800° C. for 60,000 s. All TaC0.66$^b$ pellets sintered at 1700° C. for more than 6000 s attained greater than 93% of theoretical density.

Figure 6:
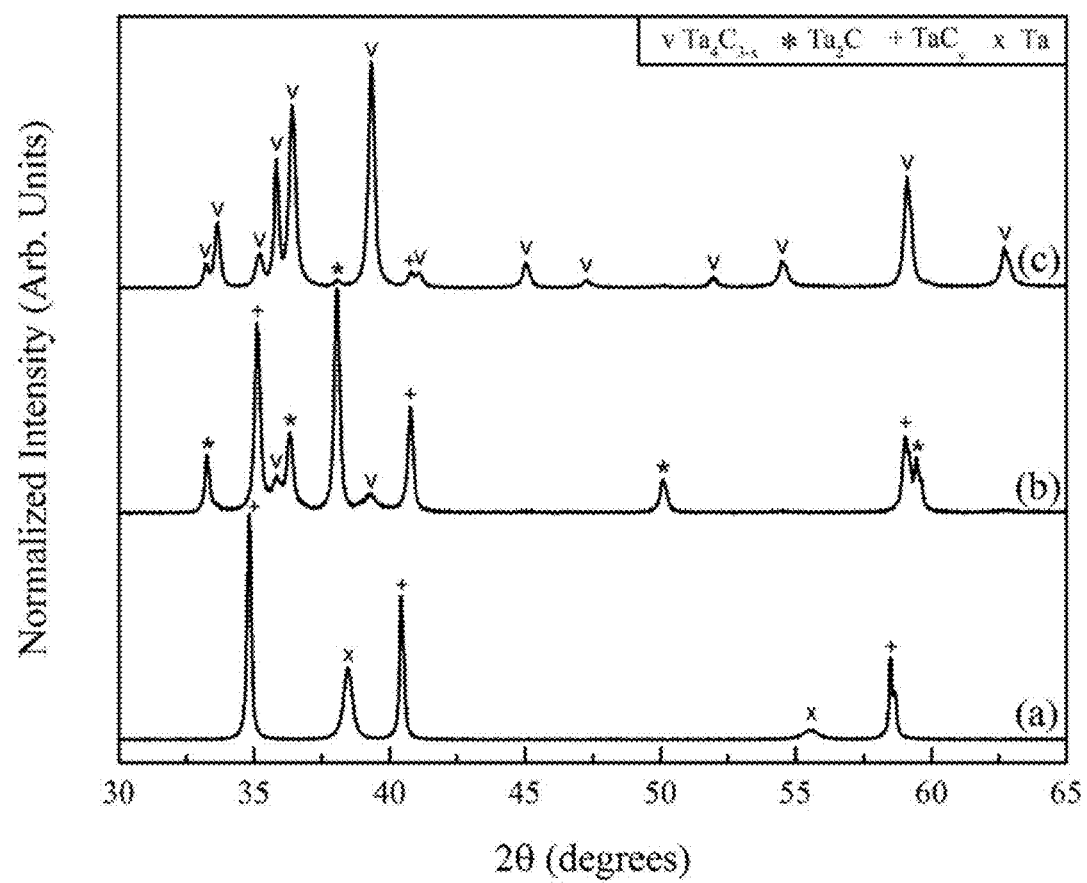
FIG. 6 shows X-ray diffraction patterns of (a) as-prepared TaC0.66$^a$ powder, (b) a pellet of TaC0.66$^a$ partially-sintered at 1800° C. and 60,000 s and (c) a hot-pressed and HIPed billet of TaC0.66$^a$.

The lack of densification in the TaC0.66$^a$ pellets had a detrimental effect on the formation of the ζ-$Ta_4C_{3-x}$ phase. FIG. 6 shows the X-ray diffraction patterns of the starting powder and of the partially-sintered pellets of TaC0.66$^a$. The starting powder (FIG. 6(a)) contained the bcc Ta and the fcc γ-$TaC_y$ phases. FIGS. 6(b) and 6(c) show the XRD patterns of a pellet sintered at 1800° C. for 60,000 s and the hot-pressed and HIPed billet, respectively. The amount of the ζ-$Ta_4C_{3-x}$ phase formed during pressureless sintering, as determined by Rietveld analysis of the XRD patterns, never exceeded approximately 0.23 weight fraction with the balance being α-$Ta_2C_{y'}$ and γ-$TaC_y$ where y=0.78 as indicated by the change in the lattice parameter. The hot-pressed and HIPed billet contained approximately 0.95 weight fraction ζ-$Ta_4C_{3-x}$ phase with the balance made up of the α-$Ta_2C_{y'}$ and γ-$TaC_y$ phases. There was no indication of peaks associated with the Wζ phase; however, there were two minor peaks (I/Imax<1%) at approximately 23° and 28° 2θ which may represent the $Ta_2O_5$ phase, but were too weak to be identified as any one specific Ta oxide phase.

Figure 7:
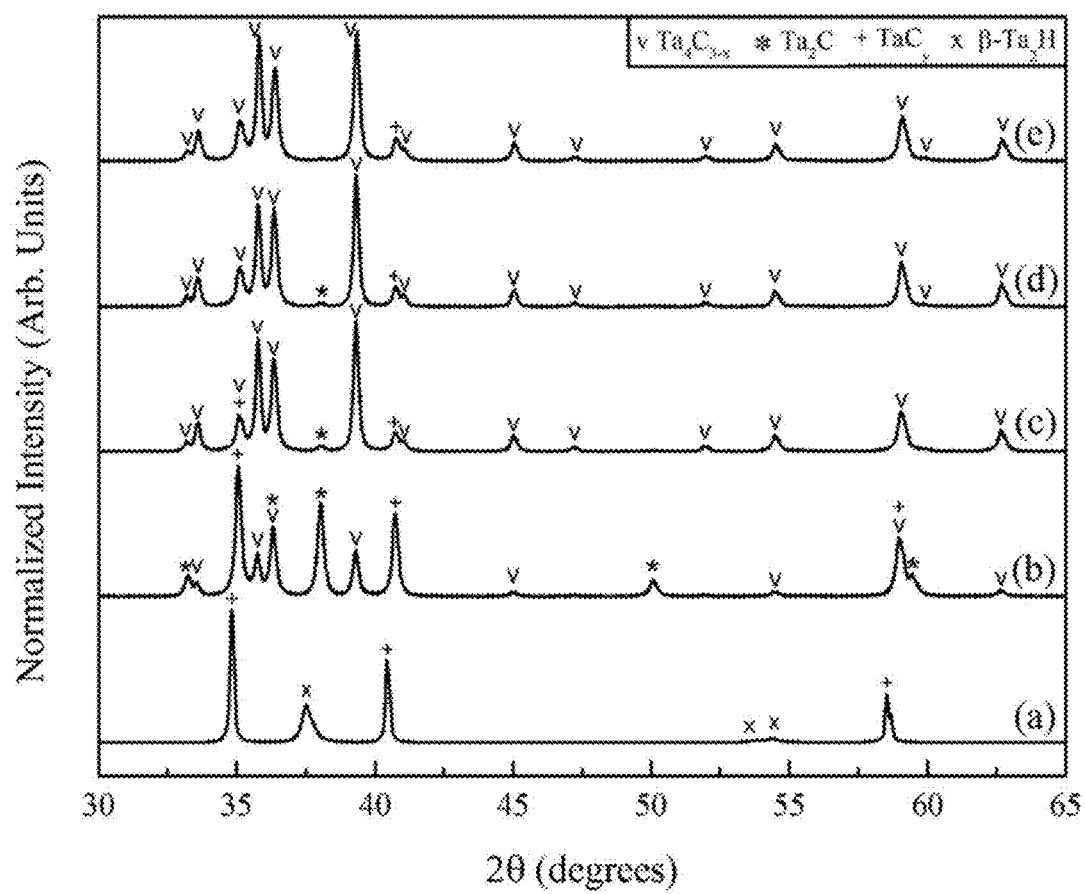
FIG. 7 shows X-ray diffraction patterns of (a) as-prepared TaC0.66$^b$ powder, and pellets sintered for 6000 s at temperatures of (b) 1600° C., (c) 1700° C., (d) 1800° C., and (e) 1900° C.

FIG. 7 shows the X-ray diffraction patterns of the TaC0.66$^b$ powder and of the partially-sintered pellets. The starting powder (FIG. 7(a)) contained the orthorhombic β-$TaH_x$ and the fcc γ-$TaC_y$ phases. FIGS. 7(b) through 7(e) show X-ray diffraction patterns of pellets sintered at 1600° C. through 1900° C. for 6000 s. Approximately, 0.11-0.13 weight fraction ζ-$Ta_4C_{3-x}$ phase formed at 1600° C. in 6000 s. The formation of the ζ-$Ta_4C_{3-x}$ phase was strongly influenced by temperature. The amount of the ζ-$Ta_4C_{3-x}$ phase formed in 6000 s increased to 0.75 weight fraction at 1700° C., and between 0.83 and 0.86 weight fraction at 1800° C. and 1900° C. The amount of the ζ-$Ta_4C_{3-x}$ phase never exceeded approximately 0.86 weight fraction at any temperature or time with the balance being γ-$TaC_y$ with a C/Ta ratio of y=0.78 as indicated by the lattice parameter shift.

Figure 8:
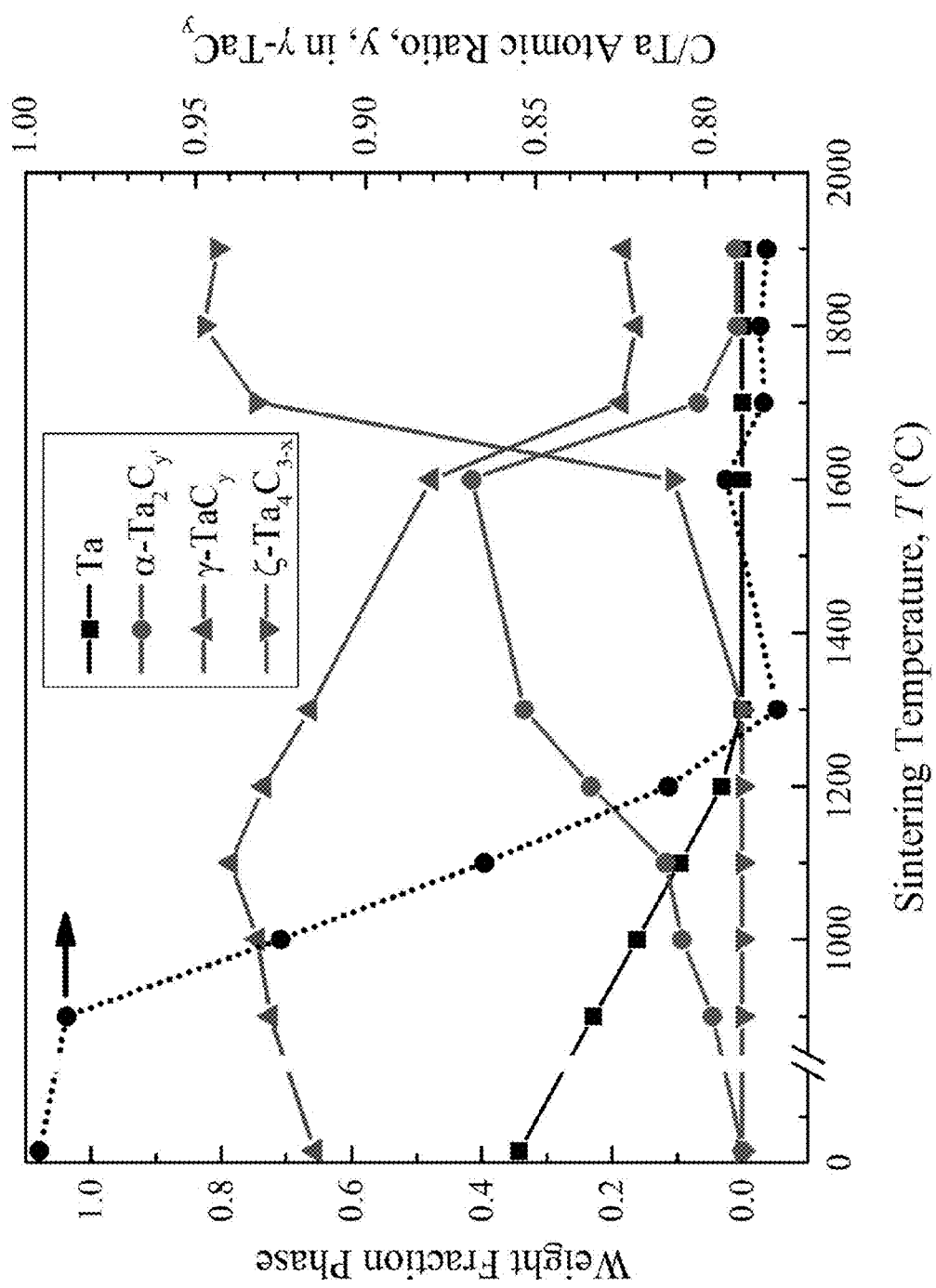
FIG. 8 is a graph of weight fractions of Ta, α-Ta$_2$C$_y$, γ-TaC$_y$, and ζ-Ta$_4$C$_{3-x}$ phases formed in pellets of TaC0.66$^b$ powder at temperatures between 900° C. and 1900° C. at hold times of 6000 s.

FIG. 8 shows plots of the weight fraction of the various phases present in the TaC0.66$^b$ pellets after sintering for 6000 s at temperatures ranging from 900° C. to 1900° C. Also plotted in FIG. 8 is y, the C/Ta atomic ratio in the phase, γ-$TaC_y$, obtained from lattice parameter correlation with composition (shown as a dotted line). At temperatures below 900° C., the phase composition of the pellets was essentially the same as that of the starting powder, i.e., 0.66 weight fraction γ-TaC and 0.34 weight fraction β-$TaH_x$. Beginning at about 900° C., the amount of the Ta phase decreased and the amount of the α-$Ta_2C_{y'}$ phase increased. Concurrently, there was a decrease in y, the C/Ta atomic ratio in γ-$TaC_y$. This suggests that the Ta metal phase was converted to the α-$Ta_2C_{y'}$ phase by the transport of C from the γ-$TaC_y$ phase. A temporary increase in γ-$TaC_y$ is also observed. It is believed that during the carburization of Ta metal the γ-$TaC_y$ phase nucleates at Ta grain boundaries long with the α-$Ta_2C_{y'}$ phase. At approximately 1100° C., there was a rapid increase in α-$Ta_2C_{y'}$ formation coinciding with a rapid decrease in γ-$TaC_y$ content while Ta continued to decrease. There was no detectable amount of Ta at 1300° C. The C/Ta atom ratio of γ-$TaC_y$ began to decrease at temperatures above 900° C. and reached a minimum level of approximately 0.78 at 1300° C. At 1300° C., there was approximately 0.34 weight fraction α-$Ta_2C_{y'}$ and 0.66 weight fraction γ-$TaC_{0.78}$ which are equal to the weight fraction contents of β-$TaH_x$ and γ-TaC in the starting TaC0.66$^b$ powder, signifying that β-$TaH_x$ was directly transformed to α-$Ta_2C_{y'}$. At 1600° C., the amount of the α-$Ta_2C_{y'}$ phase increased to 0.42 weight fraction and that of the γ-$TaC_y$ phase decreased to 0.48 weight fraction, and there was evidence for the formation of the rhombohedral ζ-$Ta_4C_{3-x}$ phase (0.11 weight fraction). The formation of the ζ-$Ta_4C_{3-x}$ phase occurred rapidly above 1600° C., with 0.75 weight fraction being formed at 1700° C. and reached approximately 0.86 weight fraction at 1800° C. with the balance being γ-$TaC_y$ and a trace amount of the α-$Ta_2C_{y'}$ phase. The formation of the α-$Ta_2C_{y'}$ phase and its subsequent equilibration with the γ-$TaC_y$ phase appeared to contribute to the formation of the ζ-$Ta_4C_{3-x}$ phase at higher temperatures. A detailed kinetics study of the formation of the α-$Ta_2C$ phase at temperatures ranging from 900° C. to 1200° C. and of the formation of the ζ-$Ta_4C_{3-x}$ phase above 1600° C. was conducted.

Figure 9:
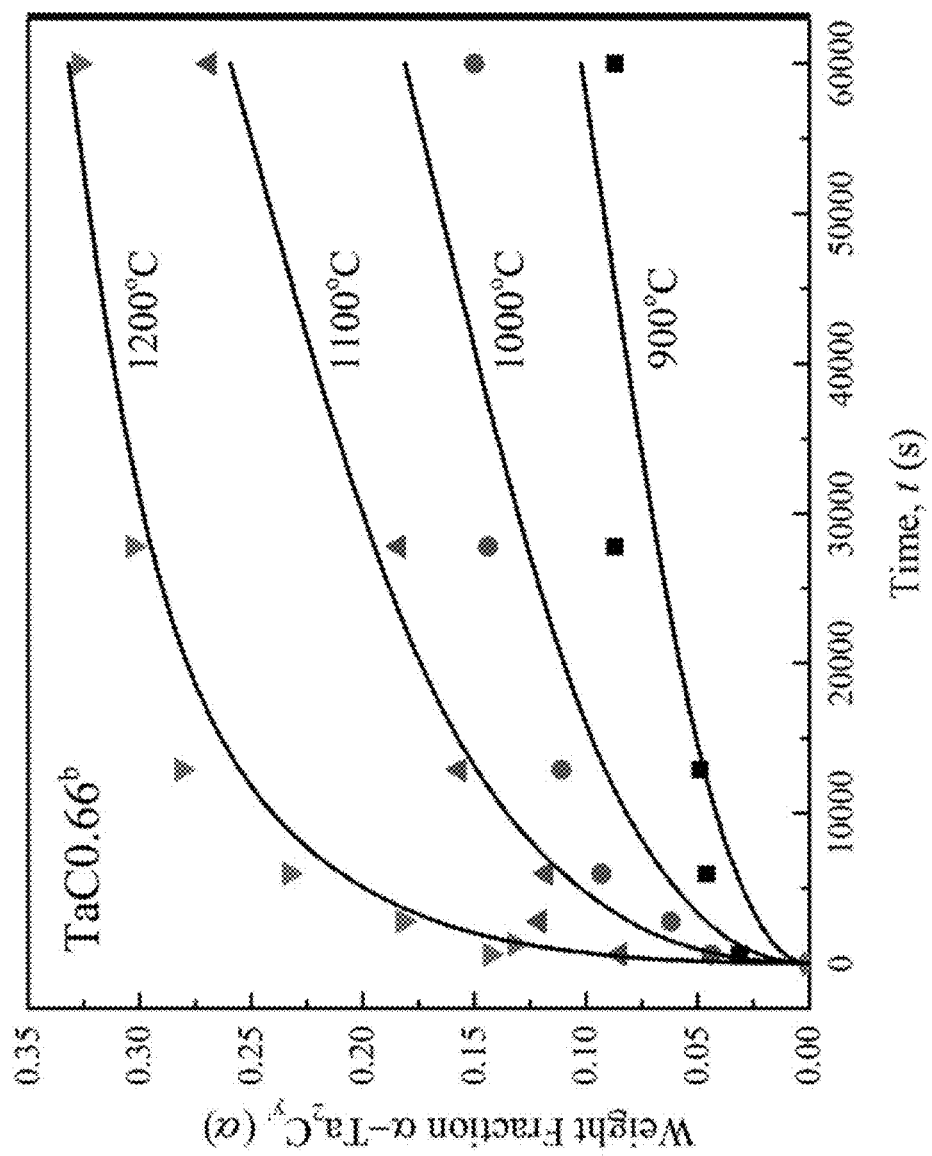
FIG. 9 is a graph of weight fractions of α-Ta$_2$C$_y$ formed in the TaC0.66$^b$ pellets as functions of time and temperature.

FIG. 9 shows plots of the weight fractions of α-$Ta_2C_{y'}$ formed as functions of time at temperatures ranging from 900° C. to 1200° C. The formation of the α-$Ta_2C_{y'}$ phase occurred rapidly with about 0.03 weight fraction being formed at 900° C. in 600 s. There was no evidence of incubation time even at the lowest temperature investigated, 900° C. The transformation rate decreased monotonically with increasing time and the amount transformed approached a plateau value at 60,000 s. Both the transformation rate at a given time and the plateau value of the fraction transformed at 60,000 s increased with increasing temperature. The weight fraction of $\alpha$-$Ta_2C_{y'}$ formed at 1200° C. and 60,000 s was 0.33, close to the weight fraction of 13-$TaH_x$ in the starting powder.

The weight fraction of $\alpha$-$Ta_2C_{y'}$, $\alpha(t,T)$, as a function of time t and temperature, T, can be described by the following form of the Avrami equation:

$$\alpha(t,T) = \alpha_\infty [1 - \exp\{-\sqrt{(kt)\times}\}] \quad (1)$$

In Eq. (1), $\alpha_\infty$ is the maximum weight fraction of $\alpha$-$Ta_2C_{y'}$ that can be formed from $\beta$-$TaH_x$ (0.34 for the TaC0.66$^b$ powder), and k is a temperature-dependent rate constant. The lines fitted to the data in FIG. 9 are the 'best fits' of Eq. (1) with values of the rate constant k estimated at each temperature by non-linear regression analysis. The temperature dependence of the resulting rate constants was analyzed using the following Arrhenius equation:

$$k = k_o \exp\left(-\frac{Q_1}{RT}\right) \quad (2)$$

Figure 10:
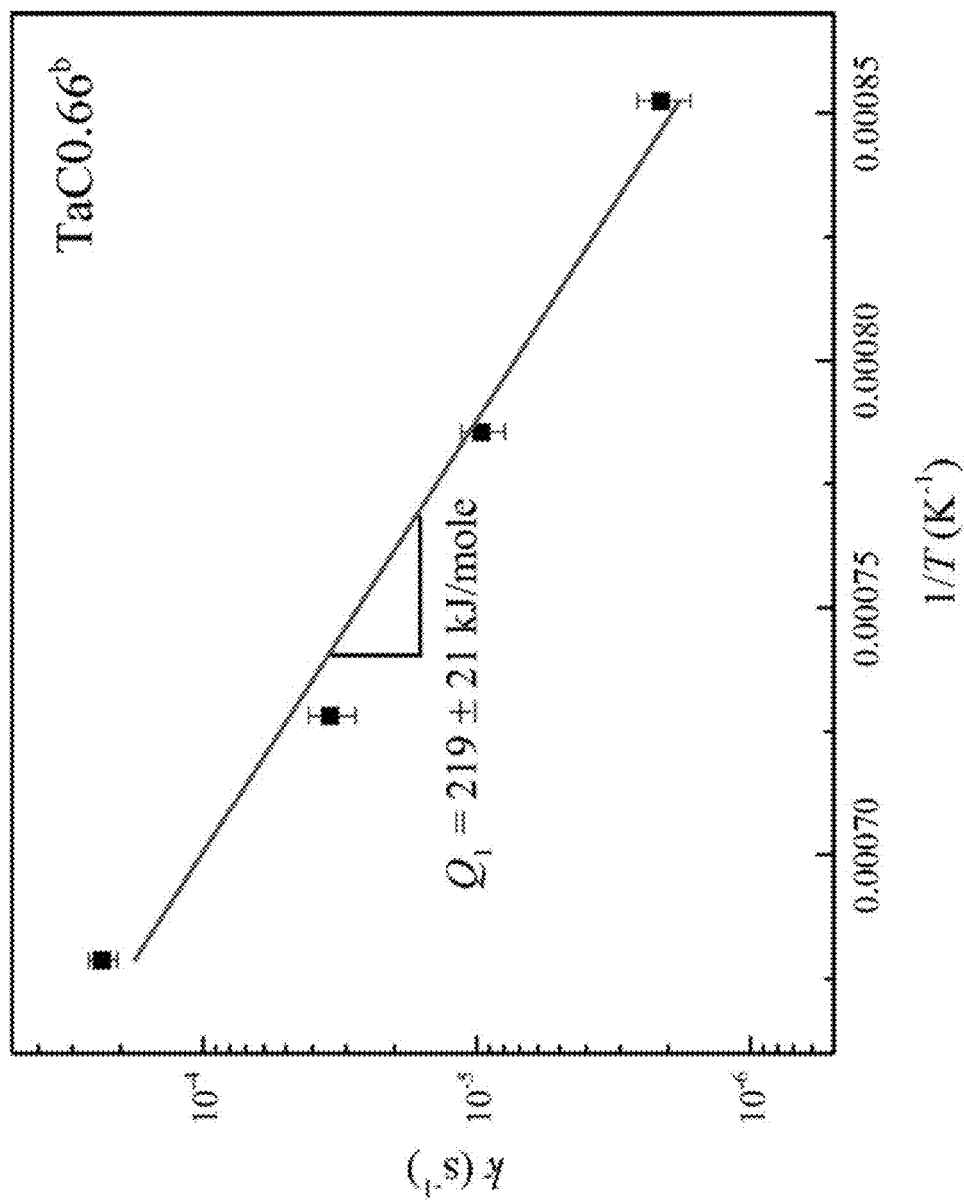
FIG. 10 is a plot of log$_{10}$ k vs 1/T for the kinetics of formation of the α-Ta$_2$C$_y$ phase.

In Eq. (2), $k_O$ is a pre-exponential factor, $Q_1$ is the activation energy, and R is the gas constant. FIG. 10 shows a plot of $\log_{10}$ k versus 1/T. The linear plot confirmed that Eq. (2) adequately described the temperature dependence of k. The activation energy $Q_1$ obtained from the slope was 219±21 kJ/mol.

Figure 11:
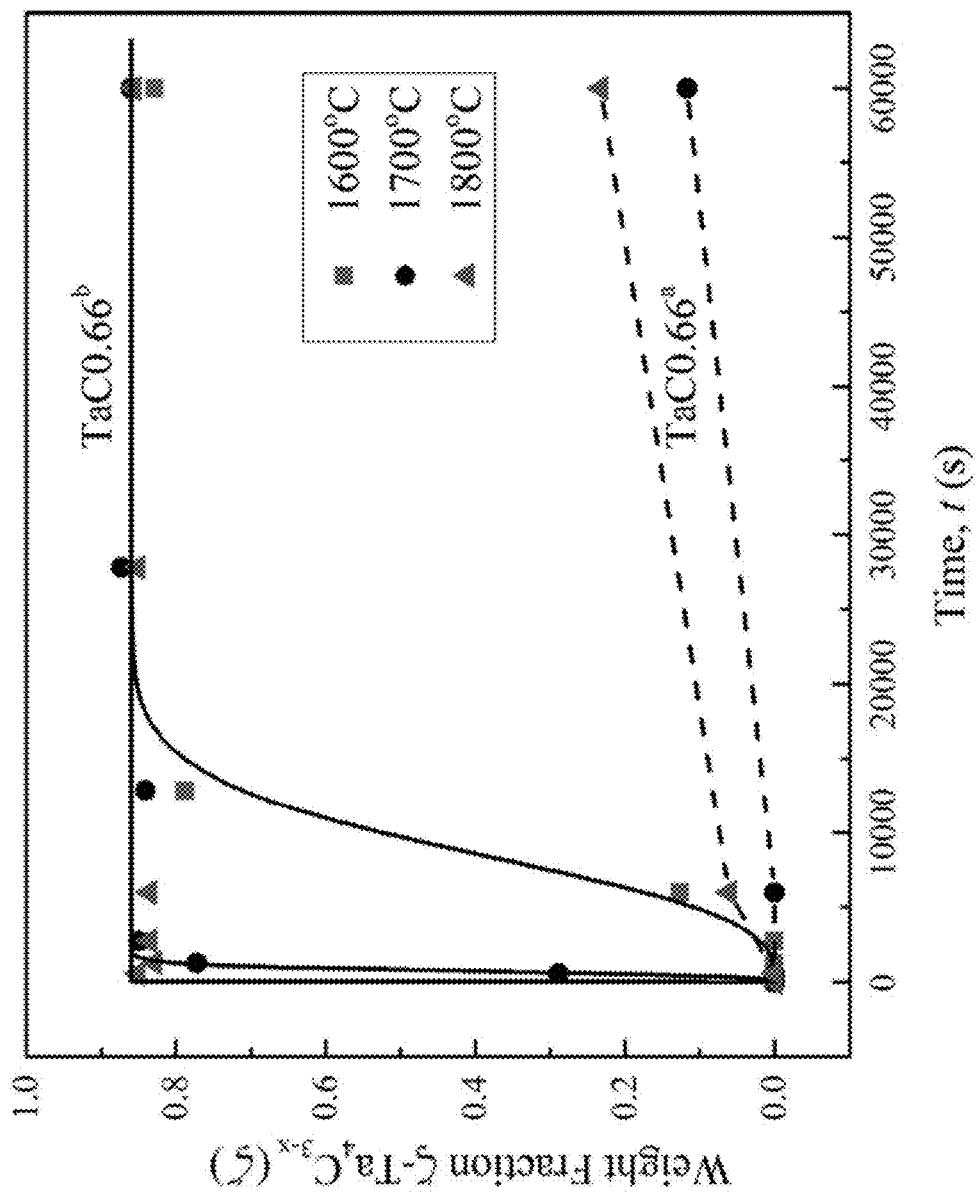
FIG. 11 is a graph of weight fraction of ζ-Ta$_4$C$_3$-x phase formed in the TaC0.66$^a$ and TaC0.66$^b$ pellets at temperatures between 1600° C. and 1800° C.

FIG. 11 shows plots of the weight fraction of the $\zeta$-$Ta_4C_{3-x}$ phase formed during sintering at various temperatures in pellets of both TaC0.66$^a$ and TaC0.66$^b$ powders. In the TaC0.66$^a$ pellets, the formation of $\zeta$-$Ta_4C_{3-x}$ was sluggish with only 0.23 weight fraction being formed at 1800° C. in 60,000 s. In the TaC0.66$^b$ pellets, on the other hand, $\zeta$-$Ta_4C_{3-x}$ formed rapidly over narrow ranges of both time and temperature. At 1600° C., for example, there was no evidence of $\zeta$-$Ta_4C_{3-x}$ after sintering for 2780 s. The weight fraction of the $\zeta$-$Ta_4C_{3-x}$ phase increased to 0.13 in 6000 s and to 0.78 in 12,900 s. Thus, there was a clear incubation period associated with the formation of $\zeta$-$Ta_4C_{3-x}$ at this temperature. Increasing the sintering temperature to 1700° C. and 1800° C. almost completely eliminated the incubation period. At 1800° C., a maximum weight fraction of approximately 0.85 was obtained in only 600 s. Further increase in either time or temperature did not increase the maximum weight fraction of $\zeta$-$Ta_4C_{3-x}$ that can be obtained in pressureless sintering.

The kinetics of formation of the $\zeta$-$Ta_4C_{3-x}$ phase during pressureless sintering of the TaC0.66$^b$ pellets can be described by the following form of the Avrami equation:

$$\zeta(t,T) = \zeta_\infty [1 - \exp\{-(kt)^3\}] \quad (3)$$

Figure 12:
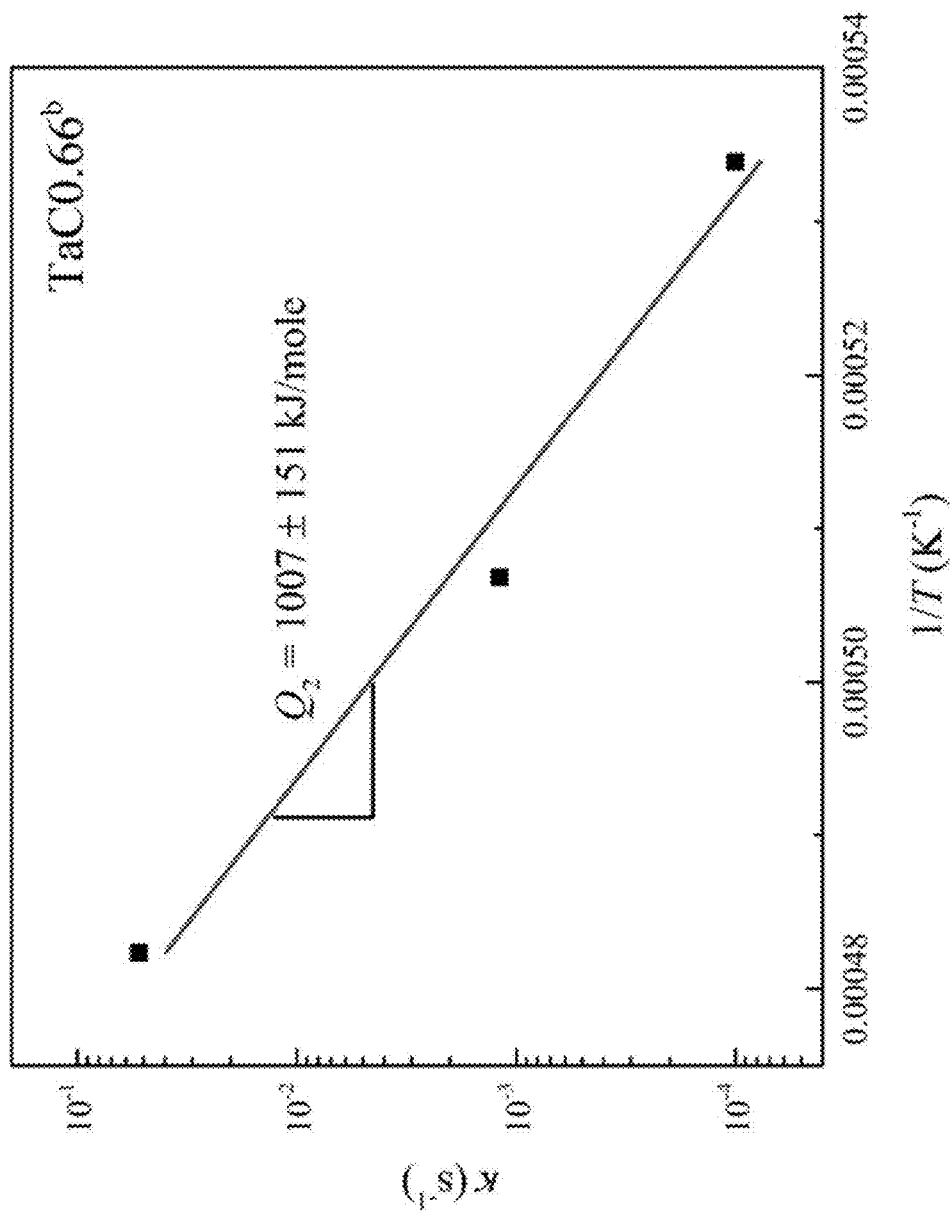
FIG. 12 is a plot of log$_{10}$κ vs 1/T for the kinetics of formation of the ζ-Ta$_4$C$_{3-x}$ phase.

In Eq. (3), $\zeta(t,T)$ is the weight fraction of $\zeta$-$Ta_4C_{3-x}$ formed in time, t, and temperature, T, $\zeta_\infty$ is the maximum weight fraction of $\zeta$-$Ta_4C_{3-x}$ that can be obtained in pressureless sintering, $\kappa$ is a temperature-dependent rate constant. The 'best fits' of Eq. (3) with the optimized values of the rate constants are shown by the solid lines in FIG. 11. It is noted that Eq. (3) gives adequate fits to the data including the representation of the incubation period observed at 1600° C. The temperature dependence of the rate constant, $\kappa$, can also be described by the Arrhenius equation. This is illustrated in FIG. 12. The activation energy for the formation of $\zeta$-$Ta_4C_{3-x}$ was, however, significantly higher, $Q_2$=1007±151 kJ/mole. The significance of the activation energies estimated and of the Avrami exponents fitted to the kinetics of formation of both $\alpha$-$Ta_2C_{y'}$ and $\zeta$-$Ta_4C_{3-x}$ phases will be discussed below.

Figures 13A, 13B:
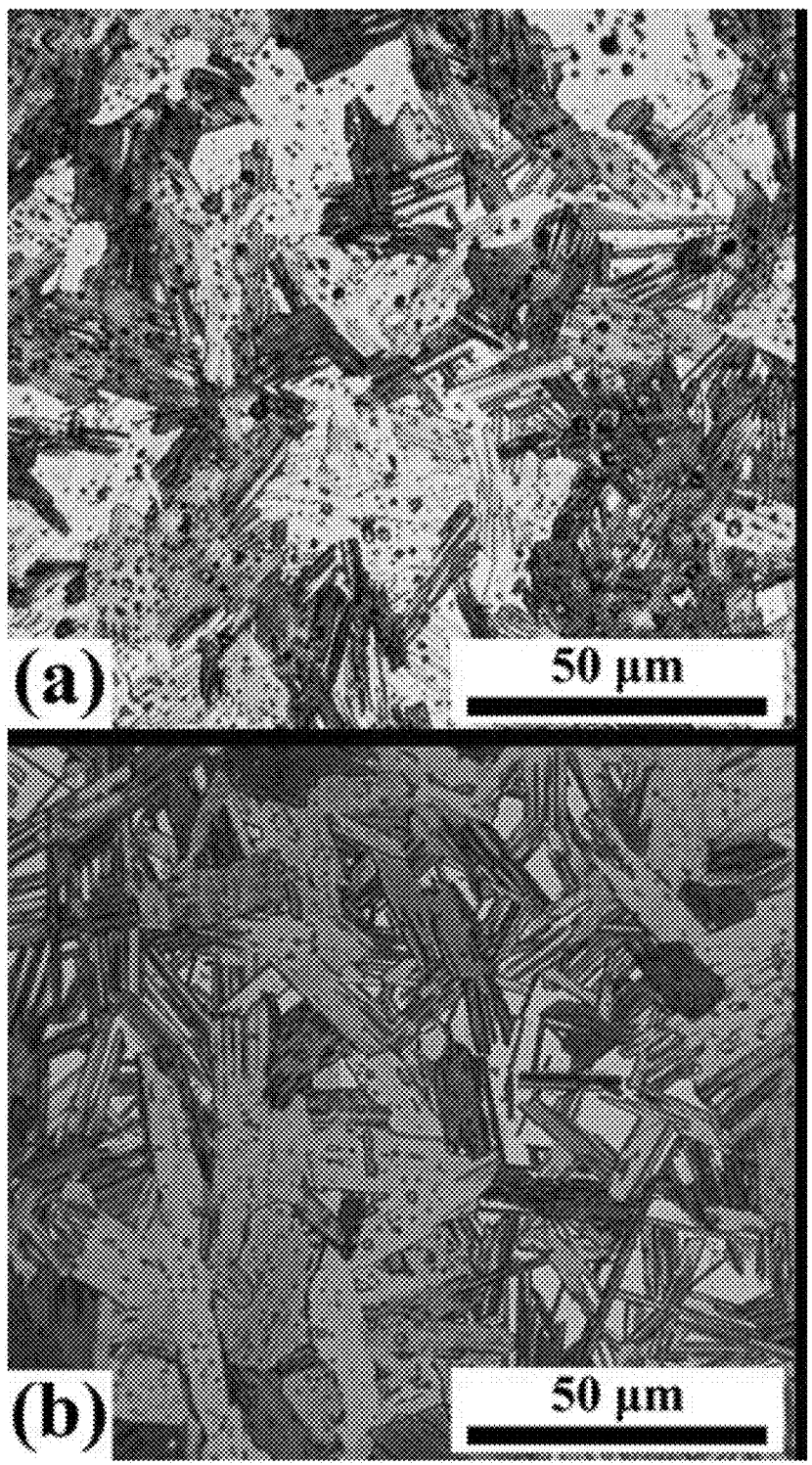
FIG. 13(a) shows an optical image of etched microstructures of a TaC0.66$^b$ pellet sintered at 1800° C. for 6000 s.
FIG. 13(b) shows an optical image of etched microstructures of a TaC0.66$^a$ hot-pressed and HIPed billet. Color code for EBSD: red: ζ-Ta$_4$C$_{3-x}$, blue: γ-TaC$_{0.78}$, green: δ-Ta$_2$O$_{5-x}$, black: undetermined phase(s) including voids.
Figure 14:
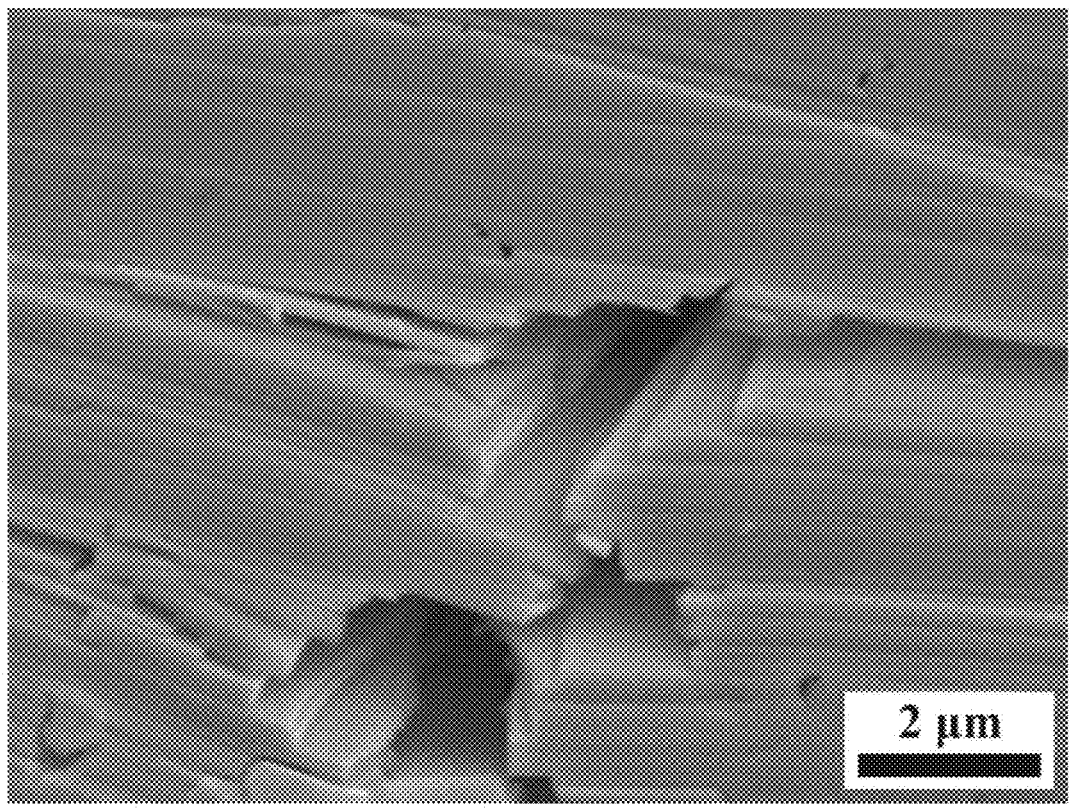
FIG. 14 shows the lamellar substructure of the ζ-Ta$_4$C$_{3-x}$ phase as revealed by a polished and indented surface of the TaC0.66$^a$ hot-pressed and HIPed billet.

FIGS. 13(a) and 13(b) show microstructures of a pellet of the TaC0.66$^b$ powder sintered at 1800° C. for 6000 s and a billet of the TaC0.66$^a$ powder hot-pressed and HIPed at 1800° C., respectively. The sintered pellet showed uniform microstructure consisting of elongated, plate-shaped grains of the $\zeta$-$Ta_4C_{3-x}$ phase, 10-20 µm in size. There was evidence of a lamellar substructure within the grains, with each lamella ranging in thickness from 40 to 300 nm. The lamellar substructure was more apparent in some grains, not so in others, presumably due to differences in the orientations of the individual grains. The lamellar substructure becomes very apparent on a polished and indented surface of hot-pressed and HIPed TaC0.66$^a$ billet as shown in FIG. 14. In addition to the lamellar substructure, there was evidence of second-phase particles, pullout of the particles, and some residual porosity. The sizes of these features were much smaller than the grain size of the $\zeta$-$Ta_4C_{3-x}$ phase. The microstructures of the pellets sintered at 1700° C. and 1900° C. were very similar to that for the pellet sintered at 1800° C. In particular, there was no evidence of growth of the $\zeta$-$Ta_4C_{3-x}$ phase as the sintering temperature was increased. The microstructure of the hot-pressed and HIPed TaC0.66$^a$ billet (FIG. 13(b)) was inhomogeneous at a macroscale. There were regions of the microstructure that consisted of a cluster of plate-shaped grains with parallel lamellae and dispersion of second phases/voids within the grains. These clusters were surrounded by regions where the $\zeta$-$Ta_4C_{3-x}$ phase had a needle-like structure with multiple orientations. The grain boundaries were not well-defined within this structure. There was evidence of a retained parent phase in between the needles.

Figure 13C:
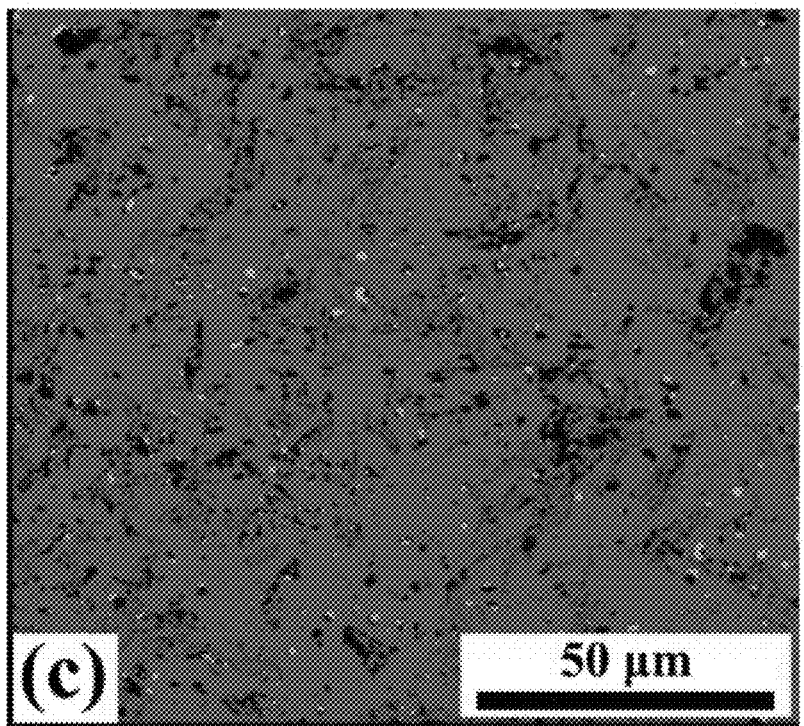
FIG. 13(c) shows EBSD image maps of the TaC0.66$^b$ pellet sintered at 1800° C. for 6000 s. Color code for EBSD: red: ζ-Ta$_4$C$_{3-x}$, blue: γ-TaC$_{0.78}$, green: δ-Ta$_2$O$_{5-x}$, black: undetermined phase(s) including voids.
Figure 13D:
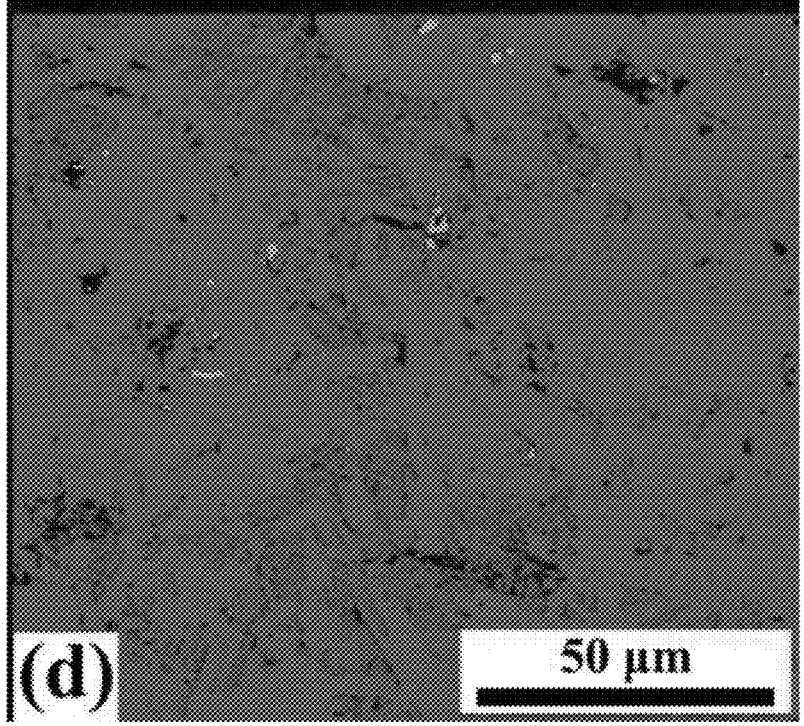
FIG. 13(d) shows EBSD image maps of the TaC0.66$^a$ hot-pressed and HIPed billet.

FIGS. 13(c) and 13(d) show EBSD images of the microstructure of the TaC0.66$^b$ pellet sintered at 1800° C. and of the TaC0.66$^a$ billet hot-pressed and HIPed at 1800° C., respectively. These images were designed to represent the different crystallographic phases with different colors based on the characteristic Kikuchi diffraction patterns of the phases. The red color represents the $\zeta$-$Ta_4C_{3-x}$ phase, the blue color corresponds to the residual $\gamma$-$TaC_y$ phase, the green color was found to correspond to an oxide phase, $\delta$-$Ta_2O_{5-x}$, and the black color corresponded to voids, pullouts and any unidentified phase(s). The area fractions of the four phases in the two materials, as estimated by EBSD, are listed in Table 1. The area fractions of the $\zeta$-$Ta_4C_{3-x}$ and the $\gamma$-$TaC_y$ phases, estimated by EBSD, were slightly less than the weight fractions of these phases estimated by X-ray diffraction (see Table 1). This was expected since X-ray analysis did not account for the voids, pullouts and the low-density $\delta$-$Ta_2O_5$, phase. The EBSD images confirmed the difference in the distribution of the two major phases, $\zeta$-$Ta_4C_{3-x}$ and the $\gamma$-$TaC_y$, in the hot-pressed TaC0.66$^a$ billet and the sintered TaC0.66$^b$ pellet. In the sintered material, the two major phases were more uniformly distributed. In the hot-pressed and HIPed material, there were clusters of the $\zeta$-$Ta_4C_{3-x}$ phase surrounded by two-phase mixtures of $\zeta$-$Ta_4C_{3-x}$ and $\gamma$-$TaC_y$.

TABLE 1

Weight Fractions of the Phases Obtained by XRD Compared with Area Fractions Measured by EBSD.

| Phase | XRD | | EBSD | |
|---|---|---|---|---|
| | TaC0.66[a] (HP + HIP) | TaC0.66[b] (PS) | TaC0.66[a] (HP + HIP) | TaC0.66[b] (PS) |
| $\zeta$-Ta$_4$C$_{3-x}$ | 0.95 | 0.84 | 0.85 | 0.78 |
| $\gamma$-TaC$_y$ | 0.03 | 0.16 | 0.10 | 0.09 |
| $\alpha$-Ta$_2$C$_{y'}$ | 0.02 | 0 | 0 | 0 |
| $\delta$-Ta$_2$O$_{5-x}$ | 0 | 0 | 0.004 | 0.01 |
| Unidentified | — | — | 0.05 | 0.11 |

The inhomogeneous microstructure seen in the hot-pressed billet, FIG. 13(b), can be rationalized in the following way. The clusters of the $\zeta$-Ta$_4$C$_{3-x}$ grains seen in FIG. 13(b) are believed to have been nucleated in the $\alpha$-Ta$_2$C$_{y'}$ grains derived from the large, plate-like particles of Ta metal. Since $\alpha$-Ta$_2$C$_{y'}$ has an hcp structure and shares the same close-packed Ta metal planes with the $\zeta$-Ta$_4$C$_{3-x}$ phase, only one variant of the $\zeta$-Ta$_4$C$_{3-x}$ phase is nucleated. This is the reason why the parallel substructure spans the entire $\zeta$ grain. Surrounding these clusters of monovariant $\zeta$ grains is a two-phase region consisting of multivariant $\zeta$ platelets in a retained fcc matrix. This region appears as needles of $\zeta$ of multiple orientations with the retained fcc phase in between (see FIG. 13(b)). This large-scale inhomogeneity is not seen in the microstructure of the sintered material (FIG. 13(a)). The phase evolution in the TaC0.66[b] pellets as a function of temperature, shown in FIG. 8, suggests that formation of the $\zeta$-Ta$_4$C$_{3-x}$ phase from the $\beta$-TaH$_x$ and $\gamma$-TaC powder mixture occurs in four stages. The first stage is the decomposition of $\beta$-TaH$_x$ that produces Ta metal:

$$0.34\beta\text{TaH}_x \rightarrow 0.34\text{Ta} + 0.17x\text{H}_2(g) \quad (4)$$

Based on the Ta—H phase diagram, the above reaction takes place at temperatures at and above the hydrogenation temperature (300-350° C.) as the solubility of atomic H in Ta decreases with increasing temperature. The nascent atomic H from $\beta$-TaH$_x$ also reacts with oxygen dissolved in the Ta metal lattice, leading to partial deoxidation of the metal. The second stage of the overall process is the conversion of the Ta metal to $\alpha$-Ta$_2$C$_{y'}$ with y' taking the value 0.86 with a concurrent depletion of C in the $\gamma$-Ta$\zeta$ phase:

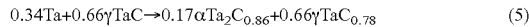

$$0.34\text{Ta} + 0.66\gamma\text{TaC} \rightarrow 0.17\alpha\text{Ta}_2\text{C}_{0.86} + 0.66\gamma\text{TaC}_{0.78} \quad (5)$$

It should be noted that in the above reaction the C concentration in the sub-stoichiometric $\gamma$-TaCy phase, i.e., y=0.78, was established from its lattice parameter (FIG. 8), while the C concentration in the sub-stoichiometric $\alpha$-Ta$_2$C$_{y'}$ was calculated from mass balance. This calculated composition of $\alpha$-Ta$_2$C$_{y'}$ is consistent with the phase diagram of FIG. 2 since the C/Ta ratio of the left boundary of $\alpha$-Ta$_2$C$_{y'}$ at 1800° C. is 0.43. The reaction of Eq. (5) is believed to involve two steps: (a) diffusion of C from $\gamma$-TaC$_y$ to Ta, and (b) nucleation and growth of $\alpha$-Ta$_2$C$_{0.86}$ when the C concentration in the Ta metal exceeds the solubility limit. The analyses of the kinetics of formation of $\alpha$-Ta$_2$C$_{y'}$ in FIG. 9 indicated that the Avrami equation with an exponent, n=0.5, gave reasonable fits to the time dependence of volume fraction transformed with the rate constant showing an Arrhenius temperature dependence. An exponent of 0.5 is typical of a transformation where the product phase grows by thickening of large plates, i.e., after complete edge impingement. This is a likely situation in the second stage since $\alpha$-Ta$_2$C$_{y'}$ grains are known to exhibit plate morphology with much higher growth rates in the basal plane than in the c-direction. In the transformation of Ta metal to $\alpha$-Ta$_2$C$_{y'}$, the rate-controlling process is likely to be the diffusion of C through the $\alpha$-Ta$_2$C$_{y'}$ phase. The activation energy estimated for the formation of $\alpha$-Ta$_2$C$_{y'}$, i.e., Q$_1$=219 kJ/mole, corresponds to the activation energy for the diffusion of C in the hcp structure of the $\alpha$-Ta$_2$C$_{y'}$ phase.

The third stage of the process, represented by the following reaction, can be described as equilibration of the $\alpha$-Ta$_2$C$_{y'}$ and $\gamma$-TaC$_{0.78}$ phases prior to forming the $\zeta$-Ta$_4$C$_{3-x}$ phase:

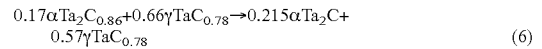

$$0.17\alpha\text{Ta}_2\text{C}_{0.86} + 0.66\gamma\text{TaC}_{0.78} \rightarrow 0.215\alpha\text{Ta}_2\text{C} + 0.57\gamma\text{TaC}_{0.78} \quad (6)$$

It is noted in FIG. 8 that this third stage of the process begins at a temperature slightly above 1200° C. This results in an increase of the weight fraction of the $\alpha$-Ta$_2$C phase to 0.43 and a decrease of the weight fraction of the $\gamma$-TaC$_{0.78}$ phase to 0.57 consistent with the lever rule applied to a bulk composition of TaC$_{0.66}$ prior to the nucleation and growth of the $\zeta$-Ta$_4$C$_{3-x}$ phase.

The fourth and final stage of formation of the $\zeta$ phase can be represented by the following balanced reaction:

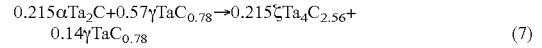

$$0.215\alpha\text{Ta}_2\text{C} + 0.57\gamma\text{TaC}_{0.78} \rightarrow 0.215\zeta\text{Ta}_4\text{C}_{2.56} + 0.14\gamma\text{TaC}_{0.78} \quad (7)$$

During this step the $\zeta$-Ta$_4$C$_{3-x}$ phase nucleates and grows on the close-packed Ta planes in both the $\alpha$-Ta$_2$C (hcp) phase and the $\gamma$-TaC$_{0.78}$ (fcc) phase as all three phases share the same close-packed Ta planes. The growth rate of the $\zeta$ phase is likely to be much higher on the basal plane than normal to it. In the $\alpha$-Ta$_2$C phase, the growth of the $\zeta$-Ta$_4$C$_{3-x}$ phase is relatively unimpeded since all nuclei within a grain grow predominantly parallel to each other without interference. In the $\gamma$-TaC$_{0.78}$ grains, however, $\zeta$ grains can nucleate on four independent close-packed planes and the growth of the grains can interfere with each other. This interpretation explains why the microstructures show some retained $\gamma$ phase even though the gross composition, TaC$_{0.66}$, is in the single $\zeta$ phase range in the phase diagram. It is interesting to note here that the amount of the retained $\gamma$ phase was less in the hot-pressed and HIPed material relative to the pressureless sintered material. This influence of the applied pressure on the formation of the $\zeta$ phase is reasonable considering that the $\zeta$ phase has a higher density relative to the $\gamma$ phase.

The growth kinetics of the $\zeta$-Ta$_4$C$_{3-x}$ phase in the TaC0.66[b] pellets was fitted using the Avrami equation with an exponent of 3. An Avrami exponent of 3 is representative of a transformation where the growth of the phase is interface controlled with site saturation for nucleation. The rate-controlling process for this transformation would be short-range diffusion across the interface for the slower moving species, i.e., Ta. The high activation energy obtained for the final stage is consistent with the activation energies reported for Ta diffusion.

Figure 15:
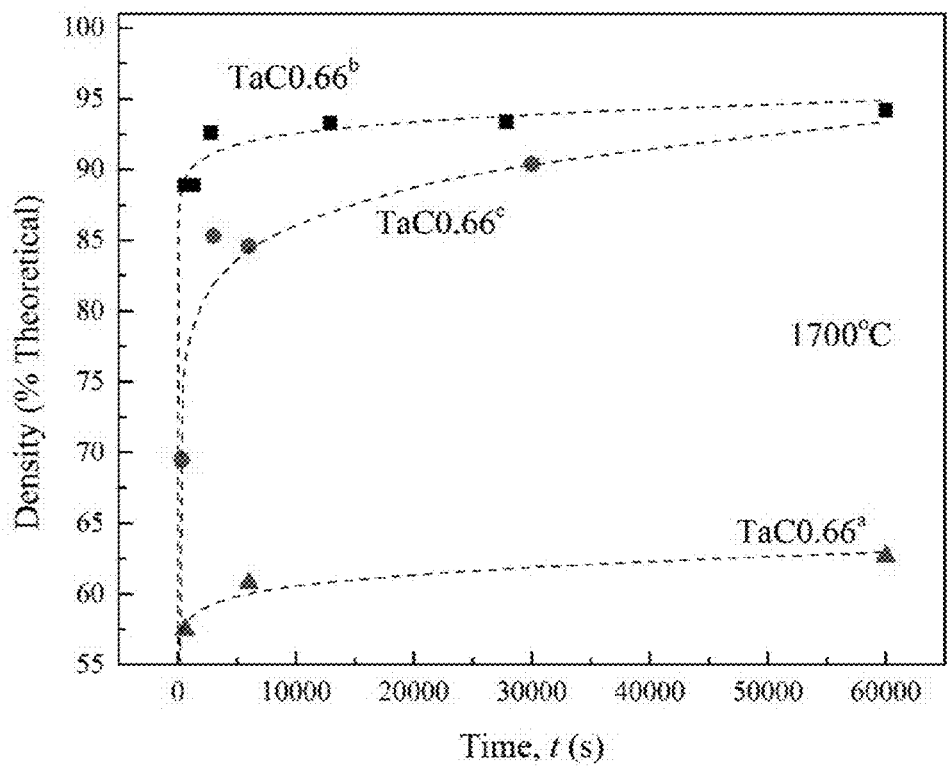
FIG. 15 is a graph of density as a function of time for sintered materials: where ▲ shows ball milled non-hydrogenated tantalum powder as starting material, ● shows results for planetary milled non-hydrogenated tantalum powder, and ■ shows ball milled hydrogenated tantalum powder.

FIG. 15 shows experimental results of density for several runs as a function of time for sintered materials: where ▲ shows ball milled non-hydrogenated tantalum powder as starting material, ● shows results for planetary milled non-hydrogenated tantalum powder, and ■ shows ball milled hydrogenated tantalum powder. Notably, hydrogenated tantalum powder exhibits a higher density than other processes. Furthermore, planetary milling of hydrogenated tantalum can also result in densities commensurate with or in excess of ball milling of hydrogenated tantalum.

Figure 16:
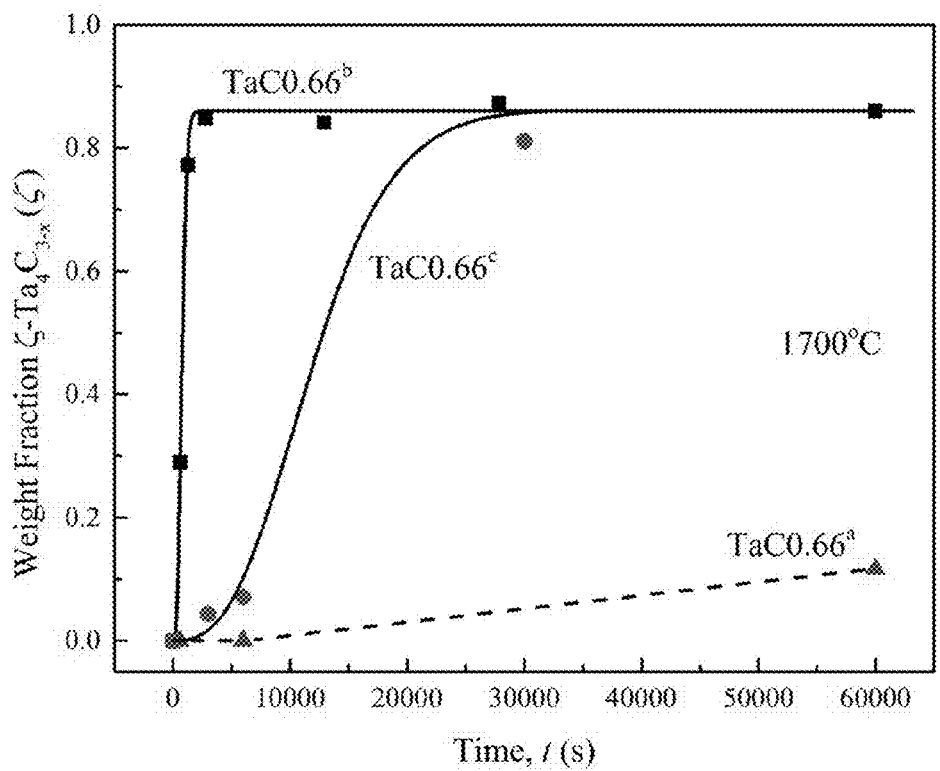
FIG. 16 is a graph showing weight fractions of the ζ-Ta$_4$C$_{3-x}$ phase in the samples illustrated in FIG. 15.

FIG. 16 is a graph showing weight fractions of the $\zeta$-Ta$_4$C$_{3-x}$ phase for the samples illustrated in FIG. 15. As can be seen, sintering of hydrogenated tantalum materials results in a high weight fraction of ζ-$Ta_4C_{3-x}$ phase (above 80%) at extremely short time frames (i.e. within about 1 hour).

Example 4: Preparing Sintered Materials

An additional set of sintered billets was prepared as follows. A Ta metal powder (Grade 73MR-0001, Inframat Advanced Materials LLC, Manchester, Conn.) and a γ-TaC powder (Grade 100, Global Tungsten & Powders Corp, Towanda, Pa.) were used as the starting powders to react and produce materials with varying wt. % ζ-$Ta_4C_{3-x}$ during consolidation. The Ta powder was reported to be 99.95% pure with oxygen (500-1800 ppm) and niobium (<50 ppm) as the major impurities. The mean particle size was in the range, 5-10 μm. The γ-TaC powder was reported as containing major impurities of tungsten (300 ppm), niobium (340 ppm), and oxygen (970 ppm). The mean particle size was 0.9 μm.

Both pressure-assisted and pressureless sintering were used to consolidate dense compacts from Ta and TaC powder mixtures. As-received Ta and γ-TaC powders were consolidated to greater than 97% of theoretical density by hot-pressing or hot-pressing and HIPing without any special treatment of the powders. To consolidate compacts by pressureless sintering, the Ta powder was treated with flowing $H_2$ at 300° C.-350° C. for 120 min to form the brittle β-$TaH_x$ phase which comminutes more efficiently than Ta. Subsequent milling reduced the particle size and maintained equiaxed particle morphology to promote uniform particle packing and high density in the sintered compacts. The hydrogenation and consolidation procedures used in this study have been described in detail in the previous paper. As-received Ta and γ-TaC powder mixtures (designated by superscript a) corresponding to C/Ta at. ratios of 0.50, 0.55, 0.625, and 0.66 were hot-pressed into billets (45 mm×45 mm×5 mm) at 1800° C. and 28 MPa pressure for 120 min and designated TaC0.50$^a$(HP), TaC0.55$^a$(HP), TaC0.625$^a$ (HP), and TaC0.66$^a$(HP), respectively. A hot-pressed TaC0.66$^a$(HP) billet was HIPed (American Isostatic Presses, Inc., Columbus Ohio) using a heating/cooling rate of 10° C./min from room temperature to 1800° C. and held isothermally for 120 min at a pressure of 207 MPa. The pressure was maintained during heating and cooling. The hot-pressed and HIPed material was designated TaC0.66$^a$ (HP+HIP).

For pressureless sintering, a mixture of $H_2$-treated Ta powder and γ-TaC powder (designated by superscript b) with a composition of C/Ta=0.66 was prepared. The powder was uniaxially pressed into billets (70 mm×70 mm×7 mm) at 18.2 MPa pressure and then cold-isostatically pressed at 310 MPa. The billets were packed in γ-TaC powder and heated in a graphite-lined furnace at a rate of 6° C./min from room temperature to 350° C. under vacuum and held for 20 min to degas hydrogen. The furnace was then backfilled with argon and heated at 25° C./min to 1500° C. and then heated to 1900° C. at 7° C./min and held isothermally for 100 min. The billets were cooled to room temperature in Ar and designated TaC0.66$^b$(PS). A pressureless sintered billet was HIPed as previously described at 1800° C. for 100 min. The pressureless sintered and HIPed billet was designated TaC0.66$^b$(PS+HIP). Billets were ground and cut (Quality Magnetics Corp, Compton, Calif.) to size B test bars (3 mm×4 mm×45 mm) as specified in ASTM standard C 1161-02c.

Example 5: Sintered Materials Characterization

Densities were measured using the Archimedes method. Identification of the crystalline phases, and calculations of the lattice parameters and weight percents of the phases were done using an X-ray diffractometer (XRD, Model Philips X'Pert-MPD, PANalytical Inc., Westborough, Mass.) with an XRD software (X'Pert High Score Plus, Version 2.2d, PANalytical, Almelo, The Netherlands). The Rietveld profile refinement algorithm of the software used crystallographic structural data (space group and atomic positions) for the α-Ta2C and the γ-Taζ phases catalogued in powder-diffraction files (powder diffraction file, ICDD, USA). Crystallographic structural data for the f-Ta4C3-x phase were obtained from Gusev et al. The theoretical densities used to normalize the measured densities were based on the calculated phase contents and the theoretical densities of the various phases present in the sintered billets. Samples were polished to a 0.1 μm finish and etched using a mixture of 20 mL $H_2O$, 5 mL $HNO_3$, 3 mL HCl, and 12 mL HF for approximately 60 to 90 s. Microstructures were recorded from the etched surfaces using an optical microscope. Crack wakes and Vicker's microhardness impressions and associated damage were studied using a scanning electron microscope (SEM, Model S-3000N, Hitachi High Technologies America, Inc., Dallas, Tex.). Grain sizes and wt. % phase contents were also measured using electron backscatter diffraction (EBSD) in a field-emission gun scanning electron microscope (Phillips XL/30 FEGSEM, Eindhoven, the Netherlands) equipped with a sensitive CCD camera and EBSD software (OIM Analysis and Data Collection, Version 7, EDAX).

Example 6: Sintered Materials Testing

Fracture strength was measured in four-point bending using type B specimens with a 40 mm support span and a 20 mm loading span as described in ASTM Standard C 1161-02. Fracture toughness was measured by the single-edge pre-cracked beam (SEPB) test method as described in ASTM Standard C 1421-10. The SEPB tests used the same type B specimens as those used in the four-point bend tests. The specimens were precracked using three Vickers indents at a load of approximately 100 N, and a bridge compression loading fixture described in the standard. The initial crack was infiltrated with an ink to delineate the crack front and measure the initial crack length, $a_0$. The initial crack lengths were typically in the range, 1.5 to 2.4 mm. Both the four-point bend and the SEPB tests were conducted using a universal testing machine (Model 5969, Instron, Norwood, Mass.) with a 1 kN load cell. Microhardness was measured using a Vickers indenter (Leco Model LM-100, St. Joseph, Mich.) at a load of 9.8 N as outlined in ASTM standard E 384-10.

Crack growth resistance (KR) was measured using SEPB specimens in four-point bending. A 0.3-mm-deep notch was cut into the 3-mm-wide side of the specimens placed in tension. Specimens were precracked as outlined in ASTM standard C 1421-1013 such that the initial crack length ($a_0$) was in the range, 1.1 to 2.1 mm. Precracked specimens were loaded in 0.5 N increments at 0.01 mm/min cross-head displacement rate and the displacement was held fixed for 5 s. If during the displacement hold the load dropped by more than 0.5 N, the specimen was unloaded and the crack length was measured using an optical microscope equipped with a micrometer specimen stage. From the minimum load at each fixed displacement and the corresponding crack length measured using an optical microscope, the applied stress-intensity factor was calculated.

Example 7: Experimental Results

Table 2 lists the materials processed, measured densities, weight percents of the phases present, lattice parameters of the phases, and densities expressed as percents of theoretical. The composition of primary interest here is TaC0.66, the composition expected to yield single-phase $\zeta$-Ta$_4$C$_{3-x}$ based on the phase diagram. The microstructures, phase contents, and properties of this material will be compared and contrasted with both single-phase $\alpha$-Ta$_2$C and single-phase $\gamma$-TaCy and two-phase composites of these phases with the $\zeta$-Ta$_4$C$_{3-x}$ phase. For this purpose, Table 2 includes some previously obtained results for these other materials.

$\zeta$-Ta$_4$C$_{3-x}$. But, this composition produced two phases, $\zeta$-Ta$_4$C$_{3-x}$ and a small amount of $\gamma$-TaC0.78. The amount of the residual $\gamma$-TaC0.78 phase varied with the consolidation method. Pressureless sintering produced the highest amount of the residual $\gamma$-TaC$_y$ phase at 13.3 wt. %. HIPing of the pressureless sintered material reduced the residual $\gamma$-TaC$_y$ phase to 10.8 wt. %, but still did not approach the low values of 4.6 and 2.5 wt. % obtained in the hot-pressed [TaC0.66$^a$(HP)] and the hot-pressed and HIPed [TaC0.66$^a$(HP+HIP)] materials. XRD analyses of the phase contents suggested that the C/Ta range where $\zeta$-Ta$_4$C$_{3-x}$ is the single phase is likely shifted to lower values. In fact, a composition range, C/Ta=0.62-0.65 for $\zeta$-Ta$_4$C$_{3-x}$, is more consistent with the weight percents of the phases in the two-phase regions calculated using the Rietveld refinement software.

Measurements of grain size by optical microscopy was difficult for materials containing large weight percents of the

TABLE 2

Densities, Weight Percents of Phases, Lattice Parameters, and Densities as Percents of Theoretical Density for Various Compositions

| Material | Measured Density (g/cc) | Weight percents of phases | | | Lattice parameters | | Density (% theoretical) |
|---|---|---|---|---|---|---|---|
| | | $\alpha$-Ta$_2$C | $\zeta$-Ta$_4$C$_{3-x}$ | $\gamma$-TaC$_y$ | a (Å) | C (Å) | |
| TaC0.50$^a$(HP) | 14.89 | 100 | 0 | 0 | 3.1067 | 4.9445 | 99.1 |
| TaC0.55$^a$(HP) | 14.76 | 58.2 | 41.8 | 0 | 3.1249($\zeta$) | 30.0725($\zeta$) | 98.8 |
| | | | | | 3.1066($\alpha$) | 4.9415($\alpha$) | |
| TaC0.60$^a$(HP) | 14.26 | 21 | 79 | 0 | 3.1227($\zeta$) | 30.0388($\zeta$) | 95.8 |
| | | | | | 3.1039($\alpha$) | 4.9273($\alpha$) | |
| TaC0.625$^a$(HP) | 14.7 | 15 | 85 | 0 | 3.1235($\zeta$) | 30.0641($\zeta$) | 98.8 |
| | | | | | 3.1067($\alpha$) | 4.939($\alpha$) | |
| TaC0.66$^a$(HP) | 14.51 | 0 | 95.4 | 4.6 | 3.1239 | 30.0627 | 97.9 |
| TaC0.66$^a$(HP + HIP) | 14.70 | 2.5 | 95 | 2.5 | 3.1242 | 30.077 | 99.1 |
| TaC0.66b(PS) | 14.37 | 0 | 86.7 | 13.3 | 3.1239($\zeta$) | 30.0731($\zeta$) | 97.1 |
| | | | | | 4.4241($\gamma$) | | |
| TaC0.66b(PS + HIP) | 14.43 | 0 | 89.2 | 10.8 | 3.1239($\zeta$) | 30.0722($\zeta$) | 97.4 |
| | | | | | 4.4223($\gamma$) | | |
| TaC0.70$^a$(HP) | 14.20 | 0 | 44.6 | 55.4 | 3.1279($\zeta$) | 30.0116($\zeta$) | 96.6 |
| | | | | | 4.4204($\gamma$) | | |
| TaC0.80$^a$(HP) | 14.11 | 0 | 0 | 100 | 4.4244 | | 96.7 |
| TaC0.90$^a$(HP) | 14.03 | 0 | 0 | 100 | 4.4379 | | 96.5 |
| TaC1.0$^a$(HP) | 14.05 | 0 | 0 | 100 | 4.4534 | | 97.1 |

Figures 17A, 17B:
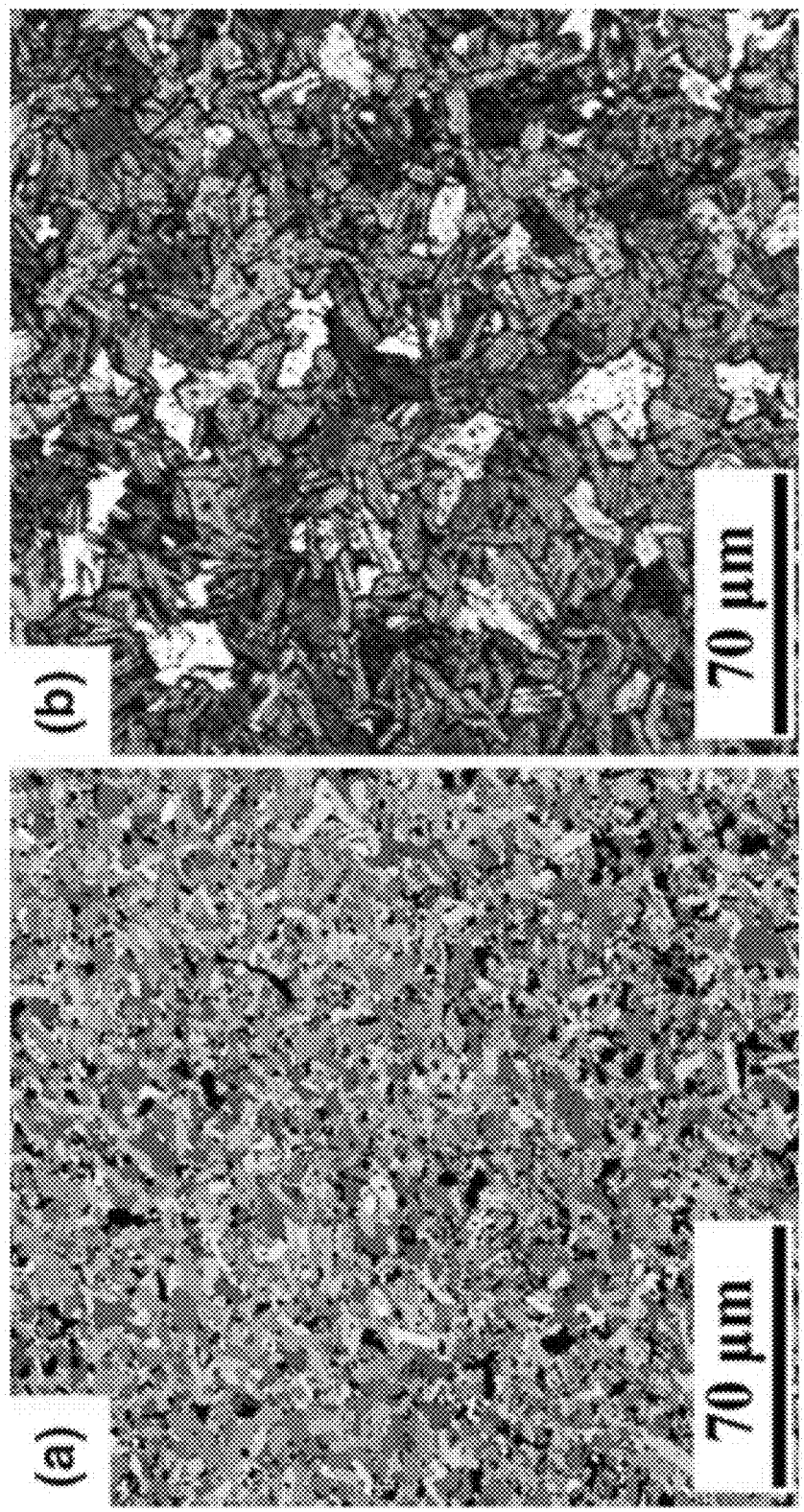
FIG. 17(a) is an EBSD orientation image of single-phase α-Ta$_2$C.
FIG. 17(b) shows an optical microstructure of TaC0.66$^a$ (HP), which was nearly single-phase with 95.4 wt. % ζ-Ta$_4$C$_{3-x}$.
Figures 17C, 17D:
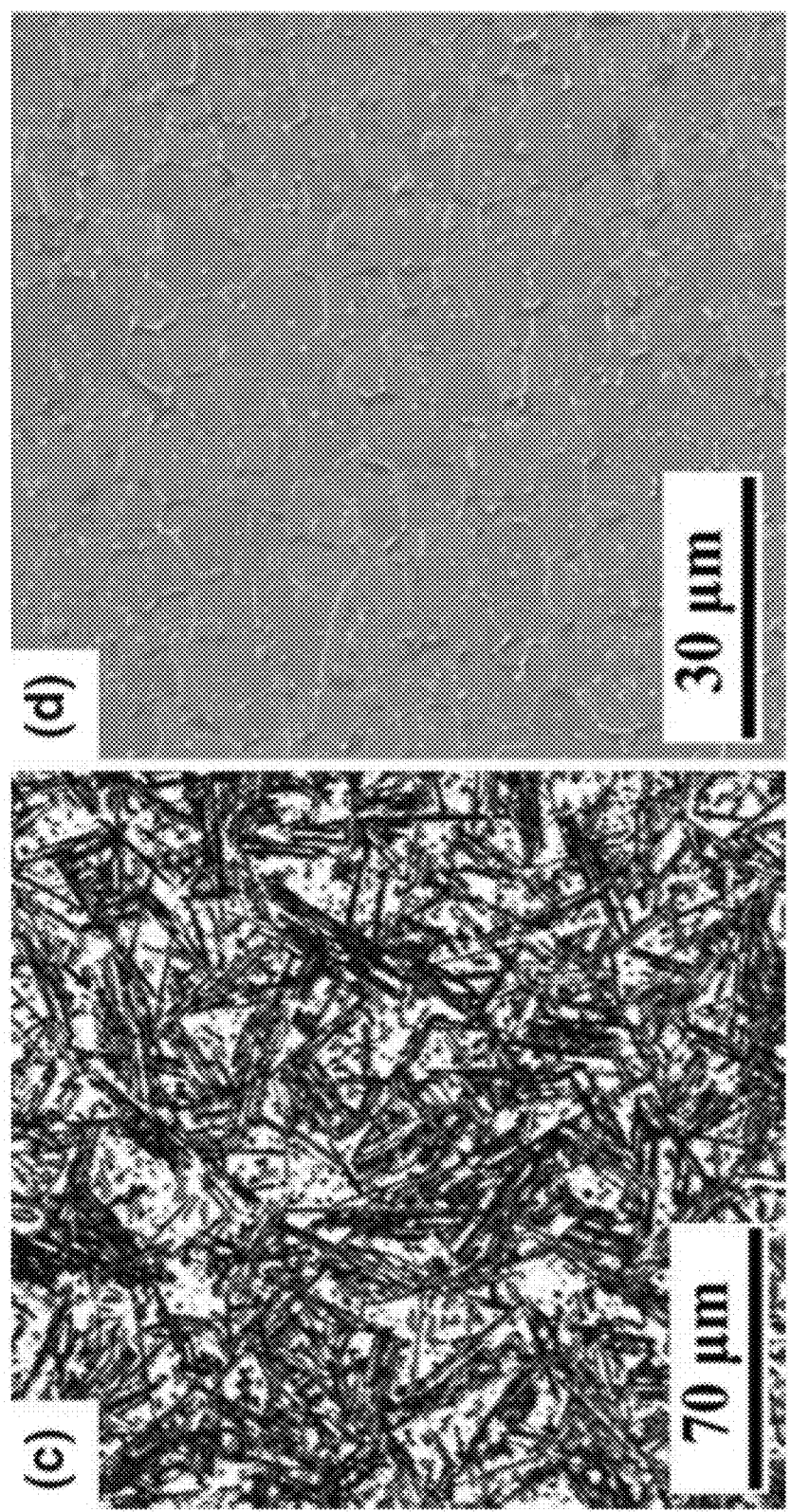
FIG. 17(c) shows an optical microstructure of TaC0.70$^a$ (HP).
FIG. 17(d) shows an optical microstructure of TaC1.0$^a$ (HP).

The measured density decreased slightly with increasing C/Ta at. ratio from 14.89 g/cc for the TaC0.50$^a$(HP) material to 14.05 g/cc for the TaC1.0$^a$(HP) material. As percent of theoretical, the density variation was from 99.1% for the TaC0.50$^a$(HP) material to 95.8% for the TaC0.60$^a$(HP) material. The compositions that produced single phases were consistent with the phase diagram. Thus, for example, TaC0.50$^a$(HP) was single-phase $\alpha$-Ta$_2$C, as would be expected. The three compositions, TaC0.8, TaC0.9, and TaC1.0 all yielded single-phase $\gamma$-TaCy. The measured lattice parameters of $\gamma$-TaCy were consistent with the initial C/Ta ratios of the powders. This suggested that there was no significant loss or gain of carbon during powder consolidation. Compositions expected to yield two-phase mixtures of $\alpha$-Ta$_2$C and $\zeta$-Ta$_4$C$_{3-x}$, that is, C/Ta=0.55, 0.6, and 0.625, did show these two phases, but the measured weight percents of the $\zeta$-Ta$_4$C$_{3-x}$ phase in the consolidated materials were consistently greater than the values calculated by applying the lever rule in the two-phase region of the phase diagram. Similarly, the TaC0.70 composition showed a mixture of the phases, $\zeta$-Ta$_4$C$_{3-x}$ and $\gamma$-TaC0.78, but the measured weight percent of the $\zeta$-Ta$_4$C$_{3-x}$ phase was less than the value calculated from the phase diagram and the lever rule. The TaC0.66 composition was expected to yield single-phase $\zeta$-Ta$_4$C$_{3-x}$ phase for two reasons: (1) the grain morphology was often complex with poorly defined grain boundaries; (2) etching of the $\zeta$-Ta$_4$C$_{3-x}$ phase often revealed a lamellar substructure, which increased the difficulty in identifying the grain boundaries. FIGS. 17(a)-17(d) illustrate the wide range of microstructures exhibited by single-phase and two-phase composites of carbides in the Ta—C system. FIG. 17(a) shows an EBSD orientation image of single-phase $\alpha$-Ta$_2$C [TaC0.50$^a$(HP)]. The different colors represent grains of different orientations. There was a mixture of both equiaxed and elongated grains. The mean grain size was 3.5 $\mu$m. An optical microstructure of TaC0.66$^a$(HP), which was nearly single-phase with 95.4 wt. % $\zeta$-Ta$_4$C$_{3-x}$, is shown in FIG. 17(b). The microstructure was much coarser than that of the TaC0.50$^a$(HP) material. Most of the grains were elongated with a mean grain size of 8.5 $\mu$m. The microstructure of TaC0.70$^a$(HP), [FIG. 17(c)], was significantly different from those of the previous materials. The microstructure consisted of randomly oriented needlelike grains (approximately 40 $\mu$m long and <3 $\mu$m wide) dispersed in a matrix. The needlelike grains are the $\zeta$-Ta$_4$C$_{3-x}$ phase, whereas the matrix is the $\gamma$-TaC0.78 phase. The TaC1.0$^a$ (HP) material had a uniform, equiaxed grain structure [FIG. 17(d)], with a mean grain size of 7.7 $\mu$m. All the materials showed evidence of a dispersed phase within the primary phase. An EBSD phase analysis indicated that this phase was the oxide, $\delta$-Ta$_2$O$_{5-x}$. The weight percent of the oxide phase was less than 1.0.

Figure 18B:
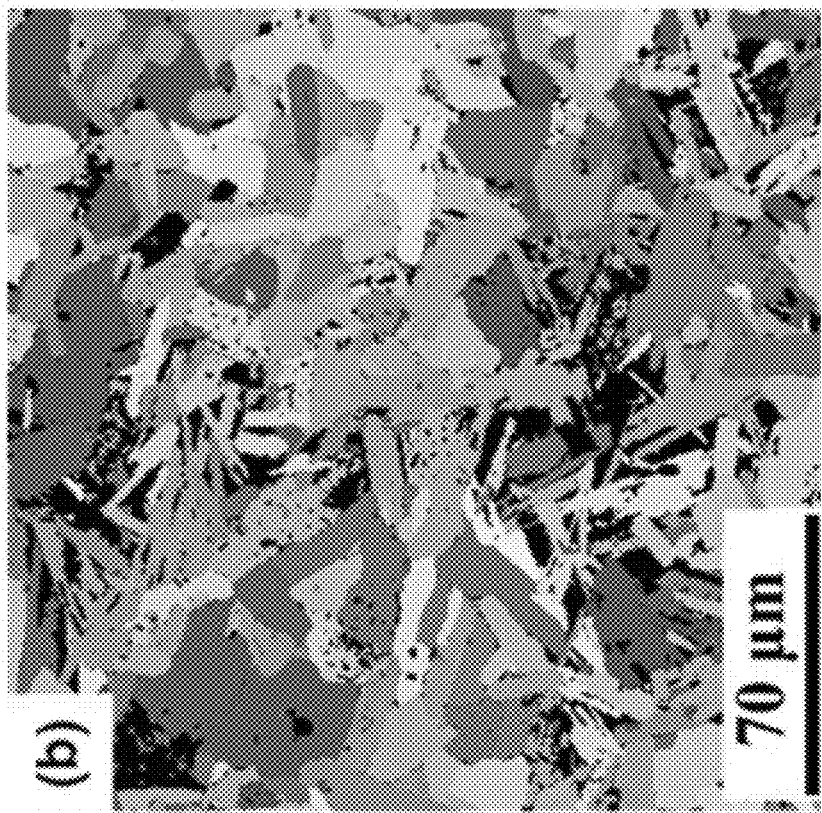
FIGS. 18(a)-18(d) are EBSD orientation image maps of (a) TaC0.66$^a$(HP), (b) TaC0.66$^a$(HP+HIP), (c) TaC0.66$^b$ (PS), and (d) TaC0.66$^b$(PS+HIP).
Figure 18A:
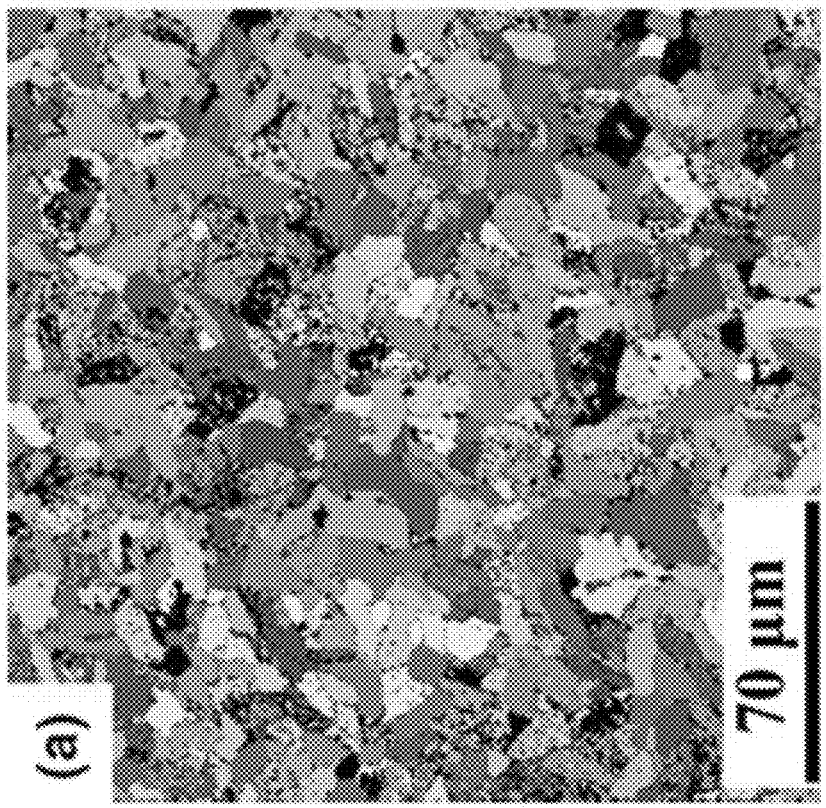
Figures 18C, 18D:
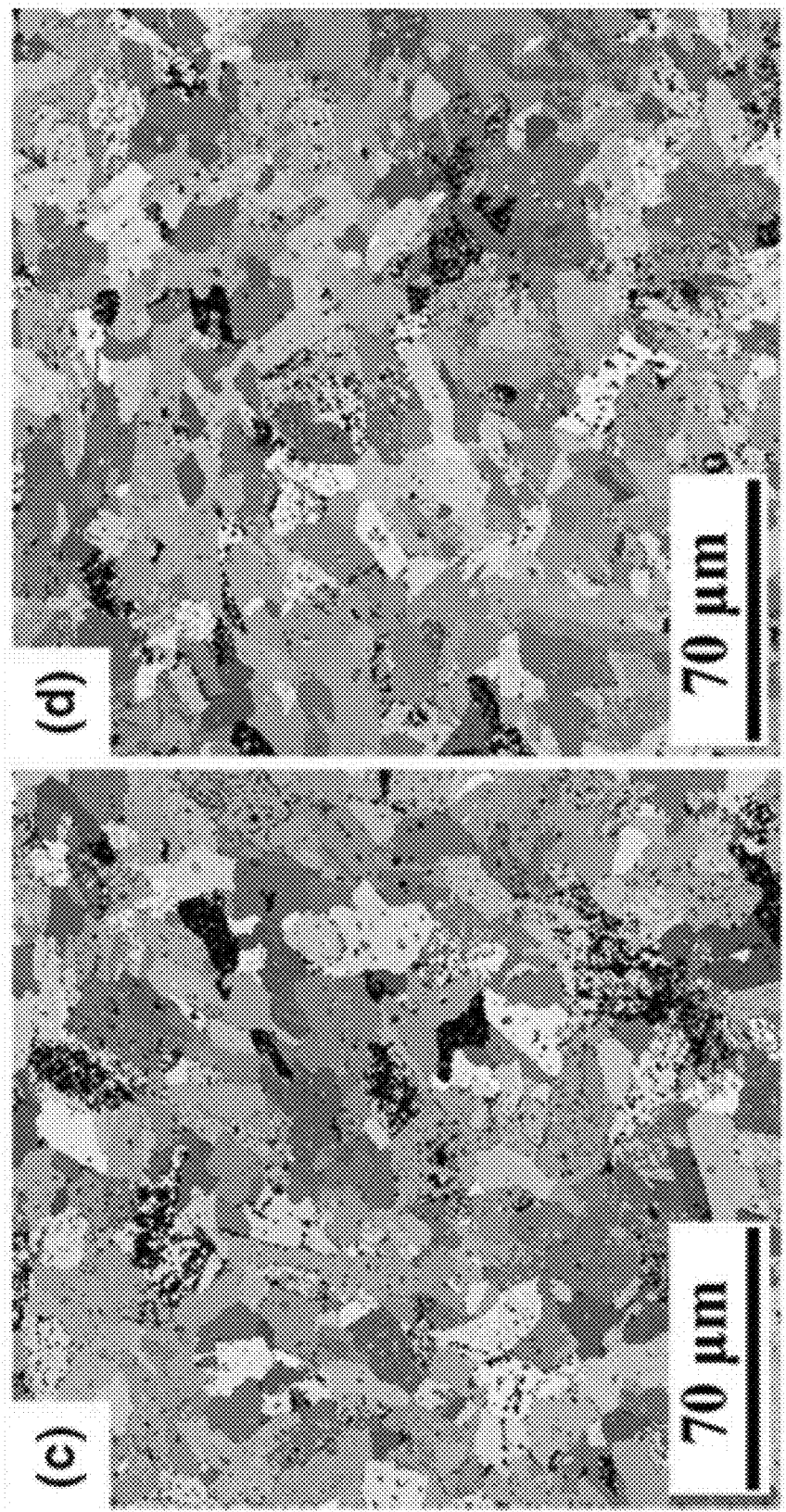

EBSD orientation image maps of: (a) TaC0.66$^a$(HP), (b) TaC0.66$^a$(HP+HIP), (c) TaC0.66$^b$(PS), and (d) TaC0.66$^b$ (PS+HIP) materials are shown in FIGS. 18(a)-18(d). The different colors represent different grain orientations of the phases. In all the images, the black color corresponds to voids, pullouts or any unidentified phase(s). The hot-pressed material [FIG. 18(a)] showed a uniform microstructure consisting of elongated, plate-shaped grains of the $\zeta$-Ta$_4$C$_{3-x}$ phase, 5-30 μm in size. The hot-pressed and HIPed TaC0.66$^a$ (HP+HIP) material [FIG. 18(b)] had larger grains than the TaC0.66$^a$(HP) material. Grains ranged greatly in size and shape and were anywhere from 5 μm or smaller in size and equiaxed in shape, to highly elongated grains approximately 60 μm 9 20 μm in size. There were regions of the microstructure that consisted of a cluster of plate-shaped grains with parallel lamellae and a dispersion of second phases/voids within the grains. These clusters were surrounded by regions where the $\zeta$-Ta$_4$C$_{3-x}$ phase had a needlelike structure with multiple orientations. The hot-pressed TaC0.66$^a$(HP) material [FIG. 18(a)] and the hot-pressed and HIPed TaC0.66$^a$(HP+HIP) material [FIG. 18(b)] had average grain sizes of 8.5 and 14.2 μm, respectively, as determined by EBSD. FIGS. 18(c) and 18(d) show the microstructures of the TaC0.66$^b$(PS) and the TaC0.66$^b$ (PS+HIP) material, respectively. The two microstructures were similar and slightly coarser than that of the TaC0.66a(HP) material.

Example 8: Mechanical Properties

Figure 19:
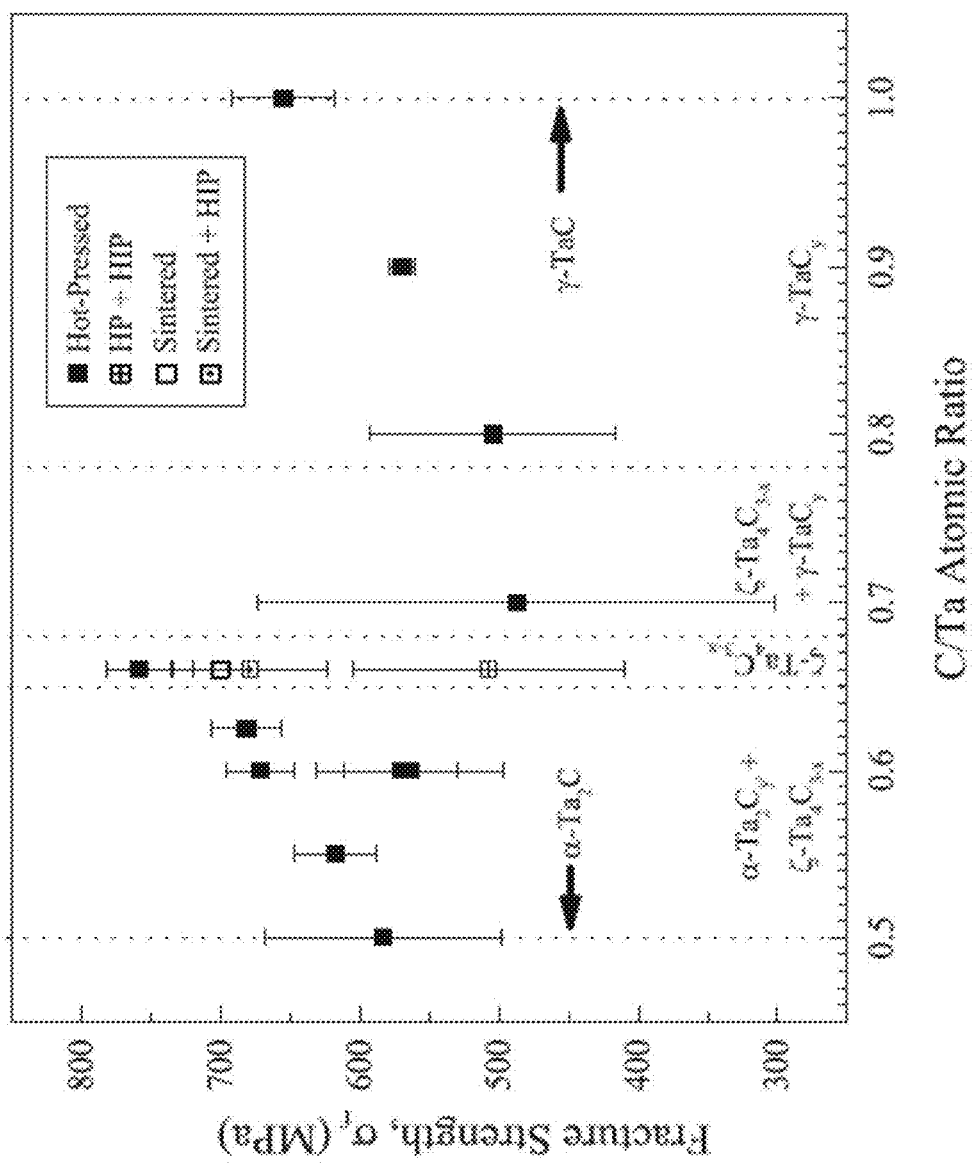
FIG. 19 shows a plot of fracture strength of various tantalum carbide materials as a function of the C/Ta at. ratio in the starting powder mix.

FIG. 19 shows a plot of the fracture strengths of tantalum carbides from Example 4 and the previously studied materials mentioned above. The fracture strengths are shown as a function of the C/Ta at. ratio in the starting powder mix. The fracture strength was highest for the TaC0.66$^a$(HP) material at 759±24 MPa. For the same composition, the strength was lower for the sintered (701±20 MPa) and the sintered and HIPed materials (679±56 MPa), and the strength was particularly low for the hot-pressed and HIPed material (508±97 MPa). This decrease in strength was consistent with an increase in the average grain size of the material as determined by the consolidation process and temperature. The fracture strength decreased with decreasing C/Ta at. ratio reaching a value of 584±85 MPa for the TaC0.50$^a$(HP) material which consisted of 100 wt. % of the α-Ta$_2$C phase. It is interesting to note that this material exhibited this low strength despite its high density and small grain size [see Table 2 and FIG. 17(a)]. This suggests that $\zeta$-Ta$_4$C$_{3-x}$ is intrinsically a stronger phase than α-Ta$_2$C, and there is potential for further increase in strength of a material containing predominantly the $\zeta$-phase by increasing the $\zeta$-phase content, decreasing its grain size and increasing the density by improved powder processing and consolidation. The trend in fracture strength with C/Ta at. ratio greater than 0.66 was also interesting. There was a precipitous drop in mean strength coupled with a large standard deviation of strength for the TaC0.70$^a$(HP) material (488±186 MPa). This was despite the presence of the needlelike $\zeta$-Ta$_4$C$_{3-x}$ grains in the microstructure [FIG. 17(c)]. For C/Ta at. ratios of 0.8, 0.9, and 1.0, the fracture strength increased and reached a value of 655±37 MPa for the stoichiometric γ-TaC.

Figure 20:
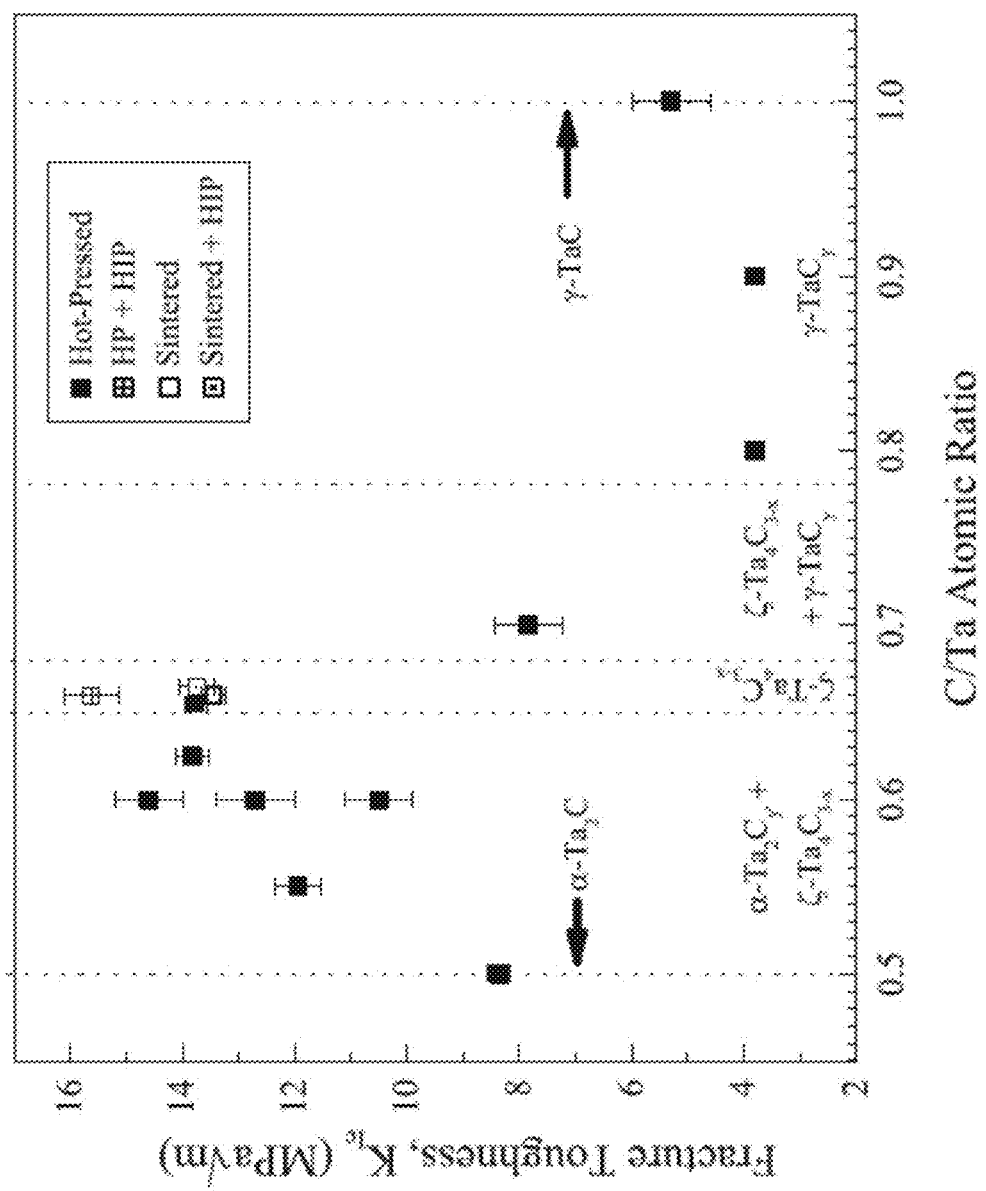
FIG. 20 shows a plot of fracture toughness of various tantalum carbide materials as a function of the C/Ta at. ratio in the starting powder mix.

FIG. 20 plots fracture toughness of materials from Example 4 and the previously studied materials mentioned above. The fracture toughness is also shown as a function of the C/Ta at. ratio. Beginning at the C/Ta at. ratio of 0.5, the fracture toughness increased from a value of 8.4±0.2 MPa√m for the single-phase α-Ta$_2$C to a maximum value of 15.6±0.5 MPa√m for the TaC0.66$^a$(HP+HIP) material that contained 95 wt. % $\zeta$-Ta$_4$C$_{3-x}$. It should be noted that this particular material had the highest weight percent and the largest mean grain size for the $\zeta$-Ta$_4$C$_{3-x}$ phase. This resulted in high fracture toughness, but at the expense of strength. Note that the fracture strength was only 508±97 MPa for this hot-pressed and HIPed material. The hot-pressed material of the same composition, C/Ta=0.66, had an attractive combination of fracture toughness (13.8±0.2 MPa√m) and fracture strength (759±24 MPa). The sintered and the sintered and HIPed material of the same composition had fracture toughness comparable to the hot-pressed material with slightly lower fracture strength. For compositions, C/Ta>0.66, there was a large drop in fracture toughness to the lowest value measured, 3.8±0.1 MPa√m for the single-phase material, γ-TaC0.8, before recovering to a slightly higher value (5.3±0.7 MPa√m) for the stoichiometric γ-TaC.

Figure 21:
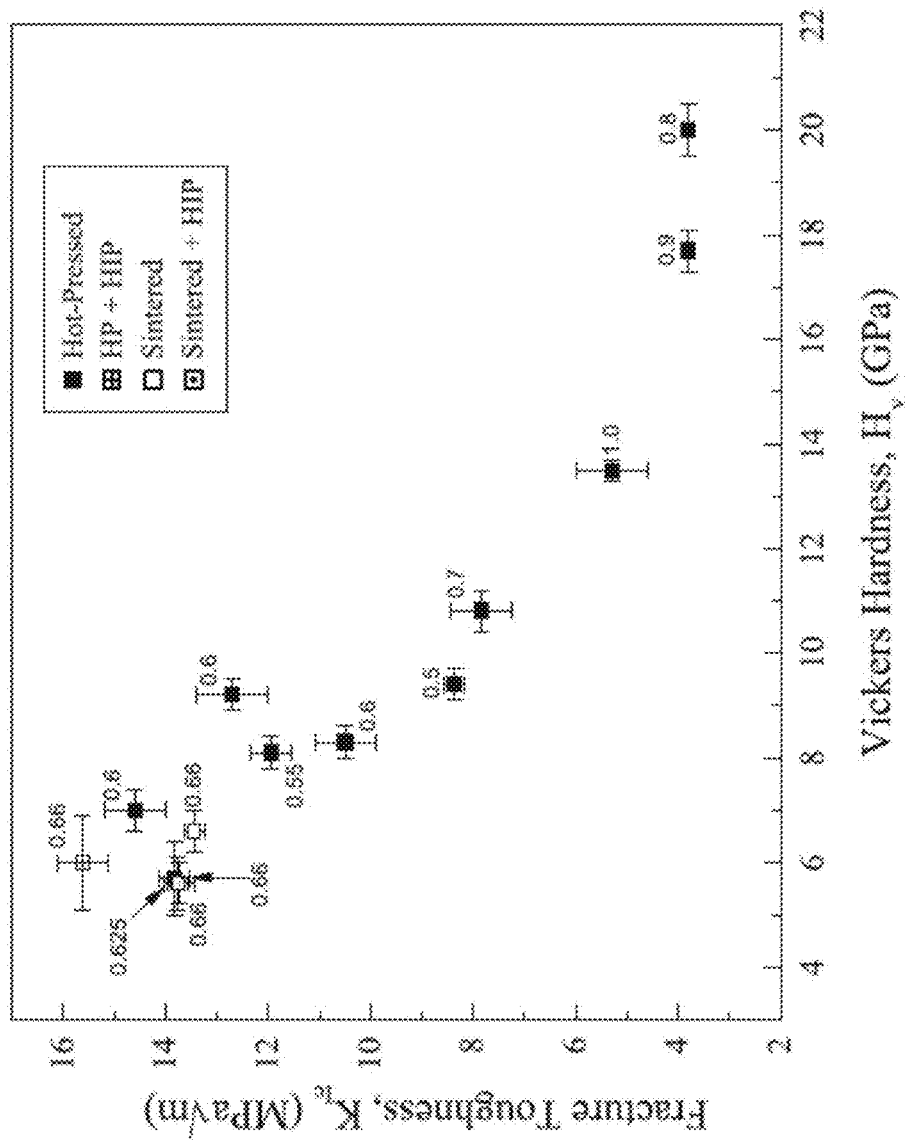
FIG. 21 shows a plot of fracture toughness of various tantalum carbide materials as a function of Vickers Hardness.

FIG. 21 shows a plot of the fracture toughness as a function of the hardness for the single-phase and two-phase tantalum carbides. A general trend of decreasing fracture toughness with increasing hardness is evident in the plot. In addition to the phases, the grain size of the dominant phase also plays a role in the hardness-toughness correlation. In FIG. 21, high fracture-toughness is also associated with large grain size, whereas the hard materials have small grain size.

Example 9: Rising Crack-Growth-Resistance Behaviors

Figure 22:
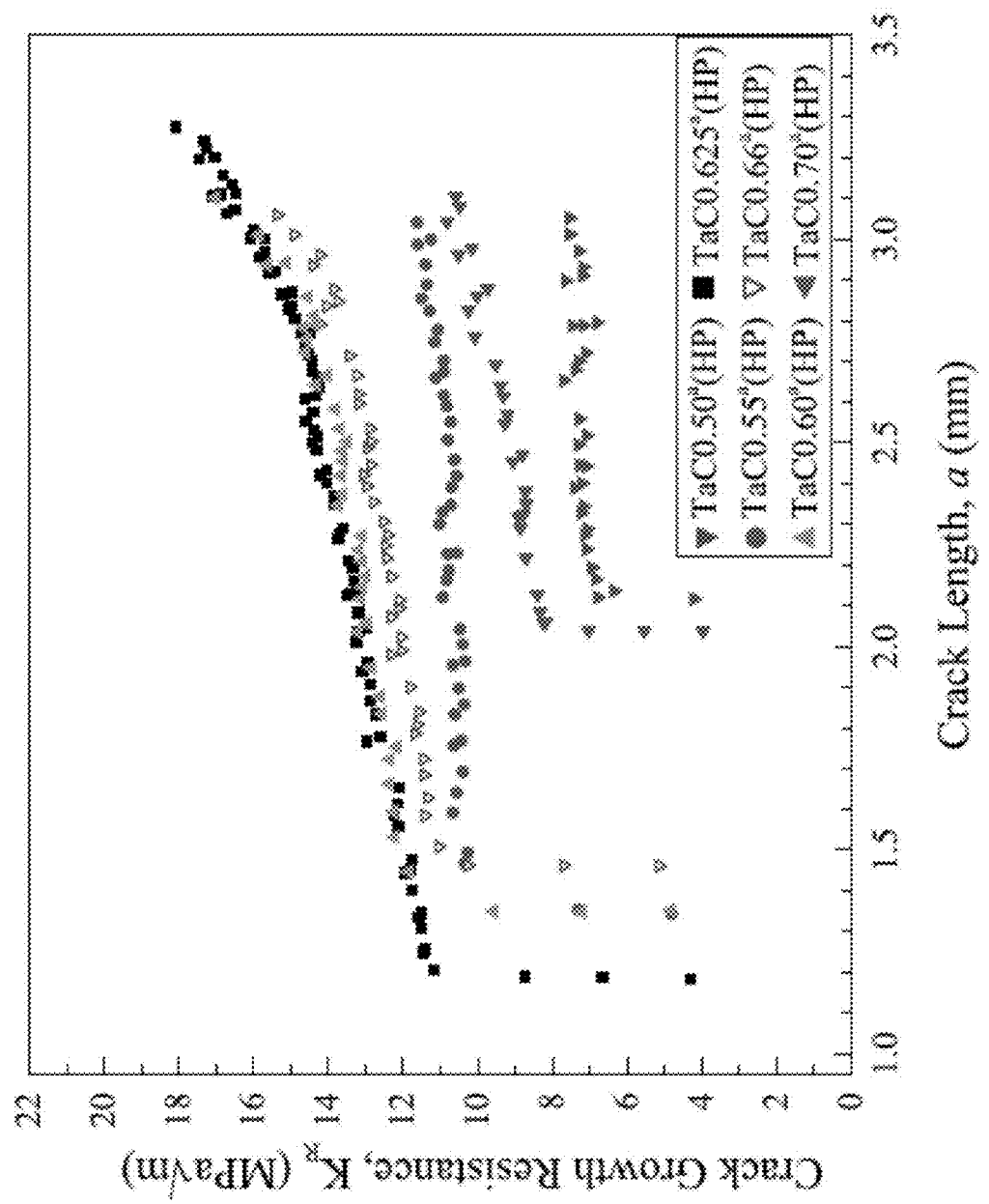
FIG. 22 shows a plot of crack-growth resistance as a function of crack length for hot pressed tantalum carbide materials.

FIG. 22 plots crack-growth resistance, KR, as a function of crack length (R-curves) for the hot-pressed materials ranging in composition from C/Ta=0.5 to C/Ta=0.7. There were three trends in the parameters of the R-curves with composition and weight percent of the $\zeta$-Ta$_4$C$_{3-x}$ phase. The compositions corresponding to high weight fractions of the $\zeta$-Ta$_4$C$_{3-x}$ phase had shorter initial crack lengths (a$_0$), higher crack-extension resistance at a$_0$, and greater slope of the R-curve. Conversely, the only material which did not contain the $\zeta$-Ta$_4$C$_{3-x}$ phase in FIG. 22, TaC0.50$^a$(HP), showed the longest initial crack length, lowest crack-extension resistance at a$_0$, and lowest slope of the R-curve. A comparison of the SEPB fracture toughness of FIG. 20 and the R-curves of FIG. 22 for the same material revealed that the SEPB fracture toughness was slightly higher than the value of KR at the same initial crack length, a$_0$. There are two likely reasons for this discrepancy. First, the initial crack length in the SEPB test specimens was measured on the fracture surface as the average of three measurements on the crack front. The crack length in the R-curve test specimens was measured as the average of two crack lengths on the side surfaces. The crack lengths on the side surfaces tend to be slightly shorter than in the middle of the thickness of the specimens. Second, the R-curve specimens had notches instead of Vickers indents to reduce the lengths of the initial cracks. The notched length of the initial crack did not have crack-bridging ligaments and, consequently, R-curve specimens did not produce as much crack shielding as the SEPB specimens. A final point of interest to note in the R-curves of FIG. 22 is that none of the tests ended in unstable fracture. The tests were terminated while the R-curves were still rising and the final crack length was in the range, 3.1 to 3.6 mm (a/W=0.775 to 0.9). This suggests that the crack-bridging zone did not reach a steady-state even at these crack lengths.

Figure 23:
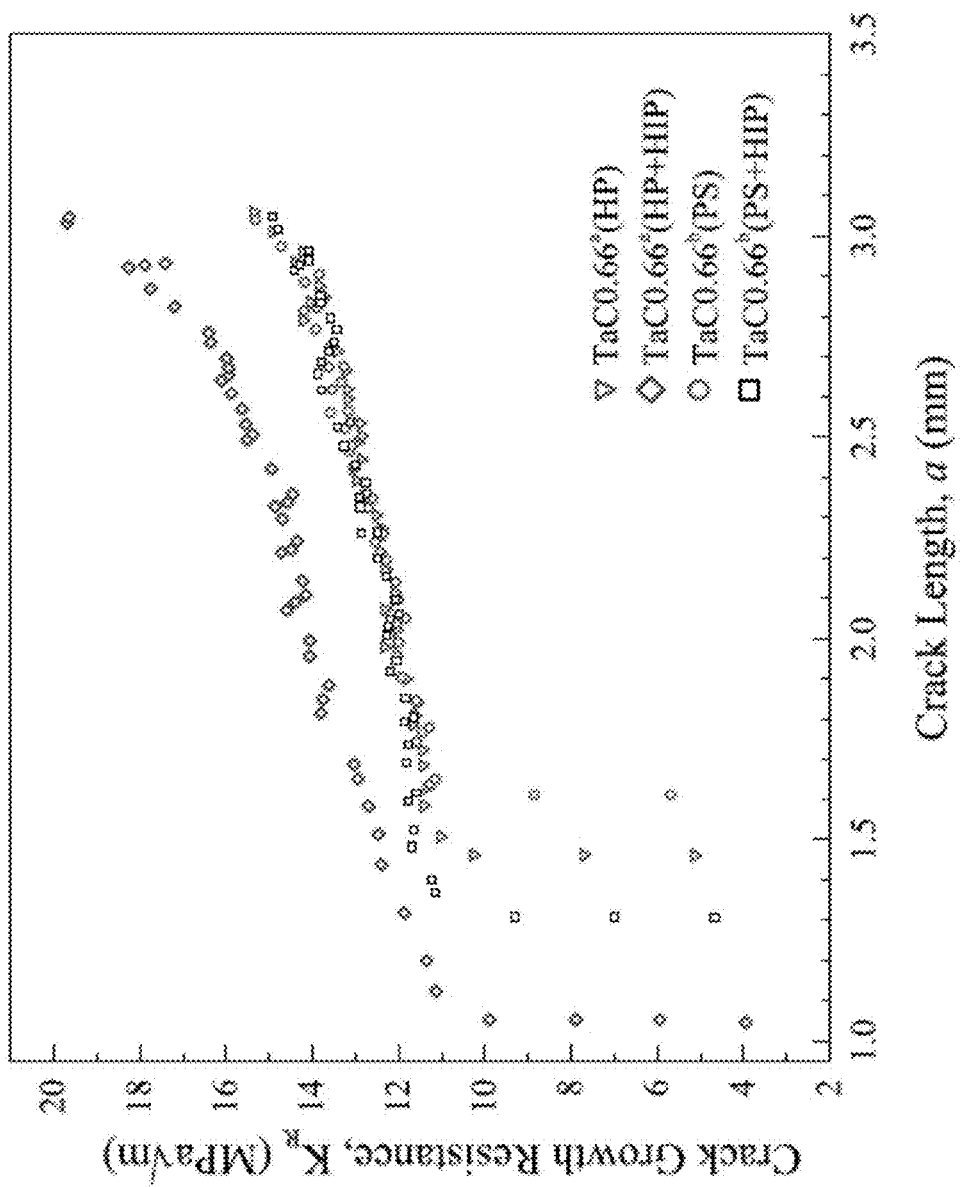
FIG. 23 shows a plot of crack-growth resistance as a function of crack length for materials of composition $TaC0.66^a$ consolidated by four different methods: hot-pressed (HP), hot-pressed and HIPed (HP+HIP), pressureless sintered (PS), and pressureless sintered and HIPed (PS+HIP).

FIG. 23 plots R-curves for materials of the same composition, TaC0.66$^a$, consolidated by four different methods: hot-pressed (HP), hot-pressed and HIPed (HP+HIP), pressureless sintered (PS), and pressureless sintered and HIPed (PS+HIP). The hot-pressed and HIPed material exhibited the highest R-curve ranging in fracture toughness from 11 MPa√m at an initial crack length of about 1.05 mm to a value of 19.7 MPa√m for a crack length of 3.05 mm. The R-curves for the other three materials, hot-pressed, PS, and PS+HIP, were essentially identical and ranged from 11 to 15.4 MPa√m. This is consistent with the SEPB fracture toughness data in FIG. 20 which showed the same trend. The hot-pressed and HIPed material has higher fracture toughness relative to the materials consolidated by the other methods. It is useful to note here again that the hot-pressed and HIPed material had both the highest content of the $\zeta$-Ta$_4$C$_{3-x}$ phase as well as the largest grain size of this phase.

Figure 24A:
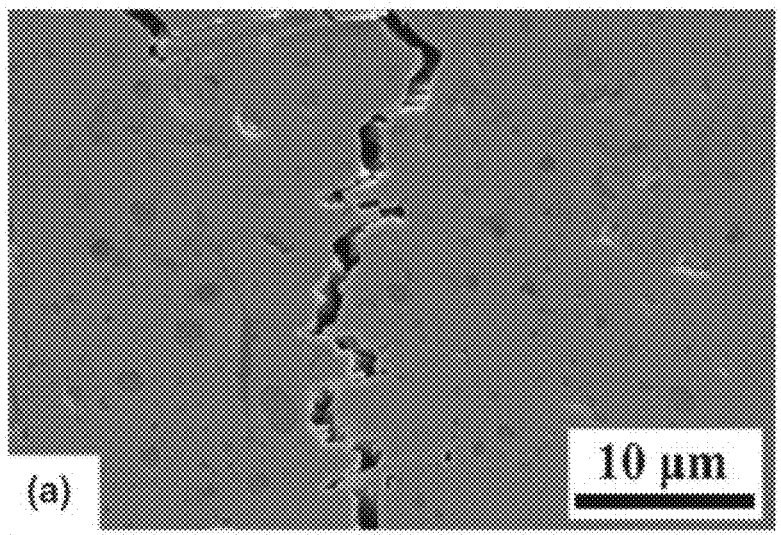
FIGS. 24(a) and 24(b) are SEM images of crack-bridging lamellae in single edge pre-cracked beam (SEPB) specimens.
Figure 24B:
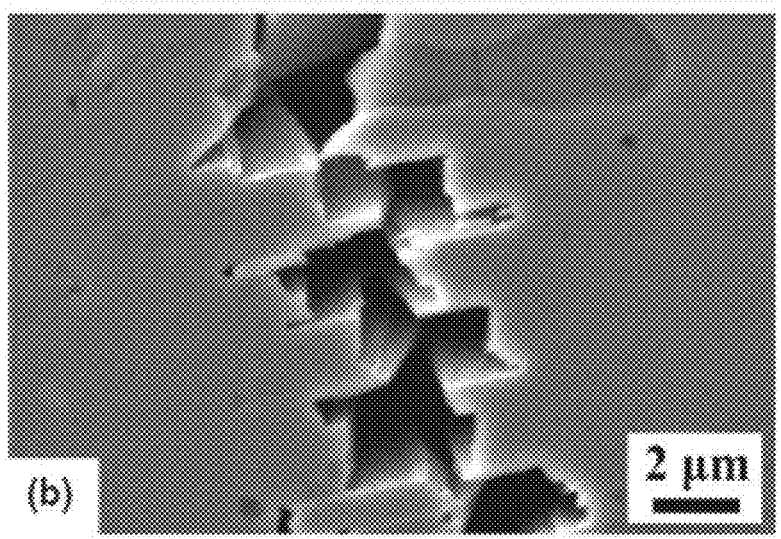
Figure 24C:
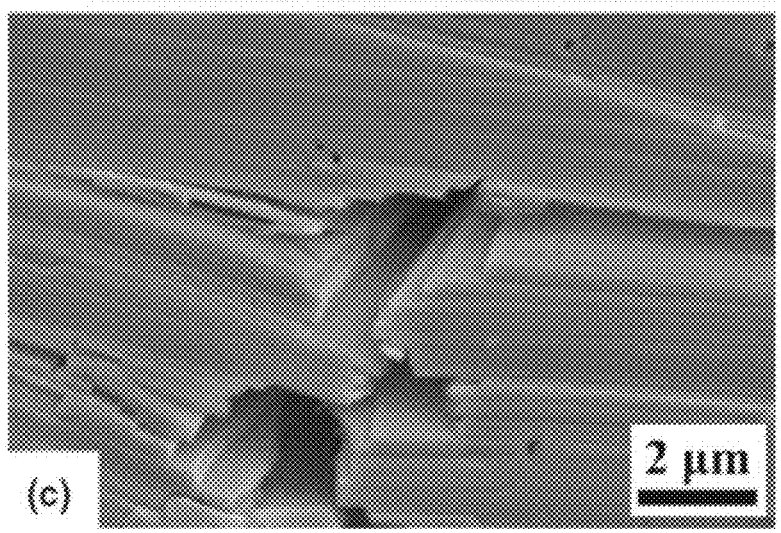
FIG. 24(c) is an SEM image of lamellae bridging of a crack in the vicinity of a Vickers indent.

A variety of mechanisms can contribute to high fracture toughness and rising-crack-growth-resistance (R-curve) behaviors of toughened ceramics. These include (a) microcracking ahead of the crack tip, (b) crack deflection or branching, (c) stress-induced phase transformation, and (d) crack-face bridging by various forms of ligaments. Optical and SEM examinations of the crack-tip and the crackwake regions of the SEPB specimens suggested that the high fracture toughness and the R-curve behavior of $\zeta$-Ta$_4$C$_{3-x}$ are likely due to crack-face bridging. Typically, the bridging ligaments in single-phase polycrystalline ceramics are large grains or elongated grains. Dispersed second-phases, such as whiskers, act as ligaments in whisker-reinforced ceramics. In polycrystalline $\zeta$-Ta$_4$C$_{3-x}$, a new type of bridging ligament applies closure traction on the crack faces in addition to whole grains. Here, these bridging ligaments are referred to as lamellae. Examples of crack-bridging lamellae in TaC0.66 material are shown in FIGS. 24(a)-24(c). FIGS. 24(a) and 24(b) show SEM images of crack-bridging lamellae in SEPB specimens, whereas FIG. 24(c) shows lamellae bridging in the vicinity of a Vickers indent. Lamellae are essentially plates or sheets consisting of the basal planes of the $\zeta$-Ta$_4$C$_{3-x}$ crystals. The SEM images, FIG. 24(c) in particular, suggest that certain basal planes in the $\zeta$-Ta$_4$C$_{3-x}$ crystal are weak cleavage planes and lead to the formation of the lamellae. The thickness of the individual lamella varied from 40 nm [FIG. 24(c)] up to 2000 nm [FIG. 24(b)]. These thicknesses of the lamellae are smaller than the shorter dimension of the grains in the c direction, 5-20 μm. Thus, lamellae bridging of cracks occurs at a scale smaller than the grain size. The easy cleavage and formation of crack-bridging lamellae in polycrystalline $\zeta$-Ta$_4$C$_{3-x}$ are somewhat analogous to toughening in ceramic laminates with weak interfaces. While the weak interfaces in ceramic laminates are man-made, the weak interfaces in polycrystalline $\zeta$-Ta$_4$C$_{3-x}$ are intrinsic to the crystal, that is, the weak interfaces are nature-made. The weak interfaces in polycrystalline $\zeta$-Ta$_4$C$_{3-x}$ are the basal planes. The in-plane dimension of the basal planes is limited to the grain size. The orientation of the basal planes of the $\zeta$-Ta$_4$C$_{3-x}$ grain relative to the direction of crack growth is expected to play an important role in lamellae bridging. Grains with basal planes oriented normal to the direction of crack growth will provide the most effective lamellae bridging, whereas those grains with basal planes parallel to the crack faces are likely to be least effective. This suggests that polycrystalline $\zeta$-Ta$_4$C$_{3-x}$ with texture is likely to show anisotropy in fracture toughness.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

What is claimed is:

1. A method of forming a sintered $\zeta$-phase tantalum carbide, comprising:
   assembling a particulate mixture including a tantalum hydride powder and a carbon source powder;
   sintering the particulate mixture to form a tantalum carbide having at least 70 wt. % of a $\zeta$-phase with at least about 90% densification, wherein the sintering is performed at a pressure of from about 0.01 atm to about 10 atm; and
   cooling the tantalum carbide to substantially retain the $\zeta$-phase.

2. The method of claim 1, wherein the carbon source powder is γ-TaC powder.

3. The method of claim 1, wherein the tantalum hydride powder is prepared by hydrogenation of a tantalum metal powder.

4. The method of claim 1, wherein the tantalum hydride powder has an average particle size of 2-20 μm.

5. The method of claim 1, wherein the tantalum hydride powder has an average particle aspect ratio from about 1 to about 1.3.

6. The method of claim 1, wherein the particulate mixture is prepared by planetary milling.

7. The method of claim 1, wherein the particulate mixture has a C/Ta mole ratio of about 0.64 to about 0.68.

8. The method of claim 1, wherein the particulate mixture has a C/Ta mole ratio of about 0.66.

9. The method of claim 1, further comprising annealing the particulate mixture at a temperature from 900° C. to 1300° C. before sintering.

10. The method of claim 1, wherein the sintering is performed at a pressure of from about 0.9 atm to 1.5 atm.

11. The method of claim 1, wherein the sintering is performed at a pressure of from about 0.01 atm to about 3 atm.

12. The method of claim 1, wherein the sintering is performed at from about 1700° C. to about 1900° C.

13. The method of claim 1, wherein the sintering is performed for a hold time from 600 s to 60,000 s.

14. The method of claim 1, wherein the sintering is performed for a hold time from 600 s to 6,000 s.

15. The method of claim 1, wherein the sintering is performed for a hold time sufficient to reach a densification of at least 94%.

16. The method of claim 1, wherein the tantalum carbide has at least about 94% densification.

17. The method of claim 1, wherein the tantalum carbide has at least 80 wt. % ζ-phase.

18. The method of claim 1, wherein the tantalum carbide has at least 85 wt. % ζ-phase.

19. The method of claim 1, wherein the tantalum carbide has less than 10 wt. % of an α-$Ta_2C$ phase.

20. The method of claim 1, wherein the tantalum carbide has less than 20 wt. % of a γ-$TaC_y$ phase.

* * * * *